US012581475B2

(12) United States Patent
Dimou et al.

(10) Patent No.: US 12,581,475 B2
(45) Date of Patent: Mar. 17, 2026

(54) HYBRID AUTOMATIC REPEAT REQUEST CODEBOOK INTERACTION

(71) Applicant: QUALCOMM Incorporated, San Diego, CA (US)

(72) Inventors: Konstantinos Dimou, New York, NY (US); Sanghoon Kim, San Jose, CA (US); Jae Ho Ryu, San Diego, CA (US); Yi Huang, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 18/183,829

(22) Filed: Mar. 14, 2023

(65) Prior Publication Data

US 2023/0300817 A1      Sep. 21, 2023

Related U.S. Application Data

(60) Provisional application No. 63/269,455, filed on Mar. 16, 2022.

(51) Int. Cl.
| | |
|---|---|
| *H04W 72/23* | (2023.01) |
| *H04L 1/1812* | (2023.01) |
| *H04W 72/11* | (2023.01) |

(52) U.S. Cl.
CPC .......... *H04W 72/11* (2023.01); *H04L 1/1812* (2013.01); *H04W 72/23* (2023.01)

(58) Field of Classification Search
CPC ............... H04W 72/11; H04W 72/232; H04W 72/0446; H04W 72/23; H04W 72/044; H04L 1/1813; H04L 5/0055; H04L 1/1887; H04L 1/1812
See application file for complete search history.

(56) References Cited

U.S. PATENT DOCUMENTS

| | | | | |
|---|---|---|---|---|
| 2013/0294318 A1* | 11/2013 | Amerga | ................... | H04W 4/06 |
| | | | | 370/312 |
| 2018/0279327 A1* | 9/2018 | Ying | ................. | H04W 72/0446 |
| 2023/0224095 A1* | 7/2023 | Bae | ........................ | H04L 1/1854 |
| | | | | 370/329 |
| 2023/0224100 A1* | 7/2023 | Bae | ........................ | H04L 1/1854 |
| | | | | 370/329 |

* cited by examiner

*Primary Examiner* — Wei Zhao
(74) *Attorney, Agent, or Firm* — Harrity & Harrity, LLP

(57) ABSTRACT

Various aspects of the present disclosure generally relate to wireless communication. In some aspects, a user equipment (UE) may detect an overlap between two or more deferred semi-persistent scheduling (SPS) hybrid automatic repeat request (HARQ) codebooks and a retransmitted HARQ codebook. The UE may cancel a transmission of the two or more deferred SPS HARQ codebooks or perform the transmission of the two or more deferred SPS HARQ codebooks in one or more slots. Numerous other aspects are described.

30 Claims, 14 Drawing Sheets

Network Node 705

UE 120

Detect an overlap between a deferred SPS HARQ codebook and a retransmitted HARQ codebook 710

Cancel transmission of the deferred SPS HARQ codebook or perform the transmission of the deferred SPS HARQ codebook in one or more slots 715

700

Detect an overlap between two or more deferred semi-persistent scheduling (SPS) hybrid automatic repeat request (HARQ) codebooks and a retransmitted HARQ codebook

1210

Cancel a transmission of the two or more deferred SPS HARQ codebooks or perform the transmission of the two or more deferred SPS HARQ codebooks in one or more slots

1220

1200

HYBRID AUTOMATIC REPEAT REQUEST CODEBOOK INTERACTION

CROSS-REFERENCE TO RELATED APPLICATION

This Patent Application claims priority to U.S. Provisional Patent Application No. 63/269,455, filed on Mar. 16, 2022, entitled "HYBRID AUTOMATIC REPEAT REQUEST CODEBOOK INTERACTION," and assigned to the assignee hereof The disclosure of the prior Application is considered part of and is incorporated by reference into this Patent Application.

FIELD OF THE DISCLOSURE

Aspects of the present disclosure generally relate to wireless communication and to techniques and apparatuses for hybrid automatic repeat request codebook interaction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

A transmission of a semi-persistent scheduling (SPS) hybrid automatic repeat request (HARQ) codebook may initially be scheduled for a slot (slot n). However, the slot n may be a downlink (DL) slot, thereby resulting in a collision. In this case, a user equipment (UE) may cancel the transmission of the SPS HARQ codebook. Canceling a transmission of a HARQ codebook in the slot may mean not performing the transmission, or withholding the transmission, of the HARQ codebook in the slot. In some cases, the transmission of the HARQ codebook may be deferred to another slot (e.g., the HARQ codebook may be transmitted in another slot). For example, the UE may cancel the transmission of the SPS HARQ codebook at the slot n and may defer the transmission of the SPS HARQ codebook by two slots to slot n+2. However, after the SPS HARQ codebook deferral (at slot n), but prior to the transmission of the deferred SPS HARQ codebook (at slot n+2), the UE may receive downlink control information (DCI) that indicates for the UE to perform a HARQ codebook retransmission at the slot n+2. Thus, both the deferred SPS HARQ codebook and the retransmitted HARQ codebook may be scheduled at the slot n+2. In some cases, if a physical uplink control channel (PUCCH) slot with a one-shot triggered HARQ codebook is determined by the UE as the target or earliest PUCCH slot for SPS HARQ codebook deferral, the deferred SPS HARQ codebook in the target slot may be appended to the retransmitted HARQ codebook. For example, the deferred SPS HARQ codebook may be appended to the retransmitted HARQ codebook, and both the deferred SPS HARQ codebook and the retransmitted HARQ codebook may be transmitted at the slot n+2. However, this may result in wasted resources and increased signaling overhead, since the HARQ bits included in the deferred SPS HARQ codebook and the HARQ bits included in the retransmitted HARQ codebook may be the same HARQ bits. Thus, the HARQ information may be transmitted multiple times in the same slot (or in nearby slots).

Techniques and apparatuses are described herein for HARQ codebook interaction. In some aspects, a UE may detect an overlap between two or more deferred SPS HARQ codebooks and a retransmitted HARQ codebook. For example, the UE may determine that the two or more deferred SPS HARQ codebooks and the retransmitted HARQ codebook are scheduled in the same slot. The UE may cancel the transmission of the two or more deferred SPS HARQ codebooks, or may perform the transmission of the two or more deferred SPS HARQ codebook in one or more slots. In one example, detecting the overlap between the two or more deferred SPS HARQ codebooks and the retransmitted HARQ codebook may include detecting an overlap between a first deferred SPS HARQ codebook, a second deferred SPS HARQ codebook, and the retransmitted HARQ codebook. The UE may transmit one or more bits of the second deferred SPS HARQ codebook via the retransmitted HARQ codebook, and may append one or more bits of the first deferred SPS HARQ codebook to the retransmitted HARQ codebook. Alternatively, the UE may transmit one or more bits of the first deferred SPS HARQ codebook and one or more bits of the second deferred SPS HARQ codebook via the retransmitted HARQ codebook. This may reduce a number of wasted resources and/or may reduce signaling overhead, for example, by reducing a number of duplicate HARQ bits that are transmitted in the same slot or in nearby slots.

Some aspects described herein relate to a method of wireless communication performed by a UE. The method may include detecting an overlap between two or more deferred SPS HARQ codebooks and a retransmitted HARQ codebook. The method may include canceling a transmission of the two or more deferred SPS HARQ codebooks or performing the transmission of the two or more deferred SPS HARQ codebooks in one or more slots.

Some aspects described herein relate to an apparatus for wireless communication performed by a UE. The apparatus may include a memory and one or more processors, coupled to the memory. The one or more processors may be configured to detect an overlap between two or more deferred SPS HARQ codebooks and a retransmitted HARQ codebook. The one or more processors may be configured to cancel a transmission of the two or more deferred SPS HARQ codebooks or perform the transmission of the two or more deferred SPS HARQ codebooks in one or more slots.

Some aspects described herein relate to a non-transitory computer-readable medium that stores a set of instructions for wireless communication by a UE. The set of instructions, when executed by one or more processors of the UE, may cause the UE to detect an overlap between two or more deferred SPS HARQ codebooks and a retransmitted HARQ codebook. The set of instructions, when executed by one or more processors of the UE, may cause the UE to cancel a transmission of the two or more deferred SPS HARQ codebooks or perform the transmission of the two or more deferred SPS HARQ codebooks in one or more slots.

Some aspects described herein relate to an apparatus for wireless communication. The apparatus may include means for detecting an overlap between two or more deferred SPS HARQ codebooks and a retransmitted HARQ codebook. The apparatus may include means for canceling a transmission of the two or more deferred SPS HARQ codebooks or performing the transmission of the two or more deferred SPS HARQ codebooks in one or more slots.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A and 5B are diagrams illustrating examples of a deferred semi-persistent scheduling (SPS) hybrid automatic repeat request (HARQ) codebook and a retransmitted HARQ codebook, respectively, in accordance with the present disclosure.

5

Figure 11:
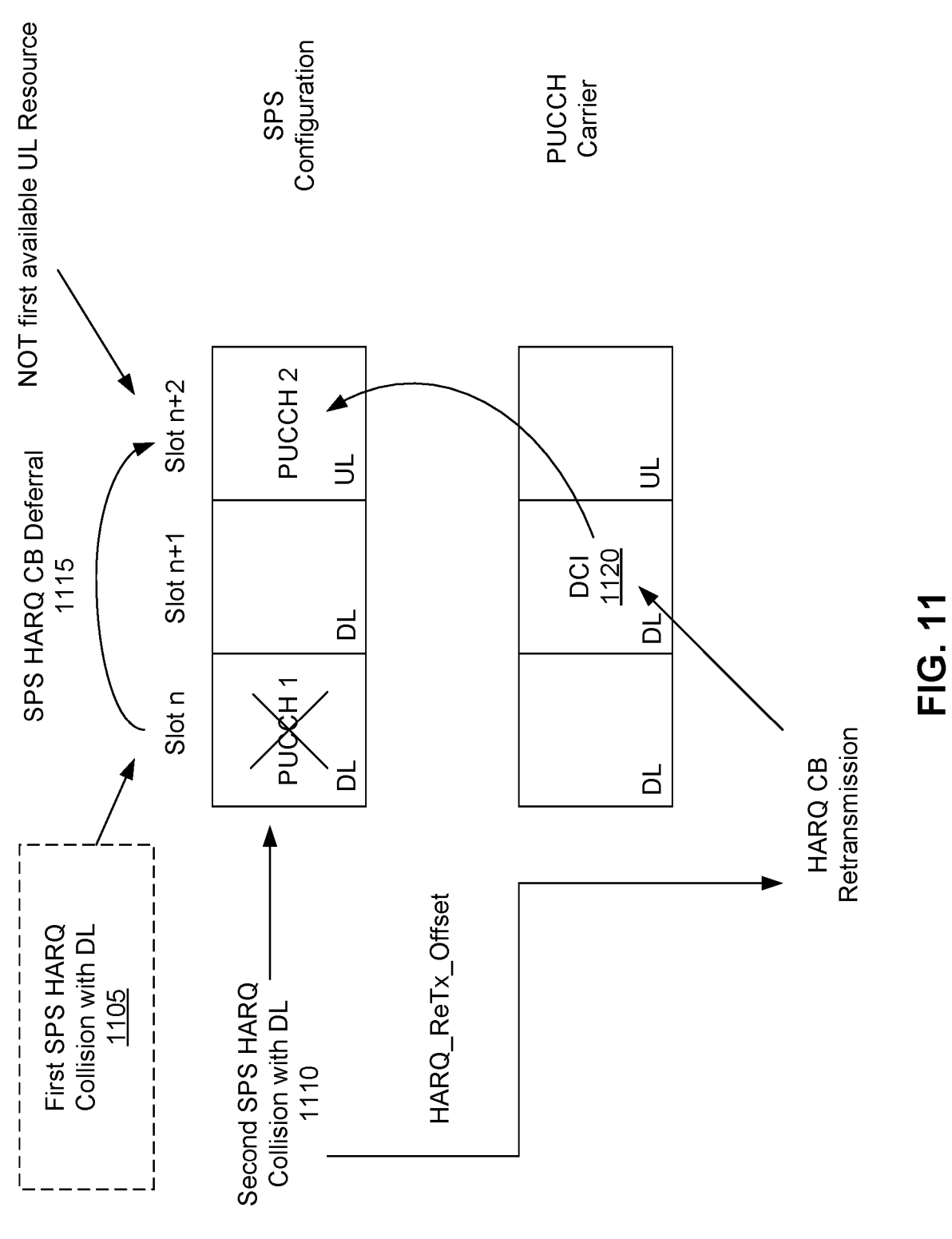

FIG. 11 is a diagram illustrating a fourth example associated with resolving a HARQ codebook interaction.

Figure 12:
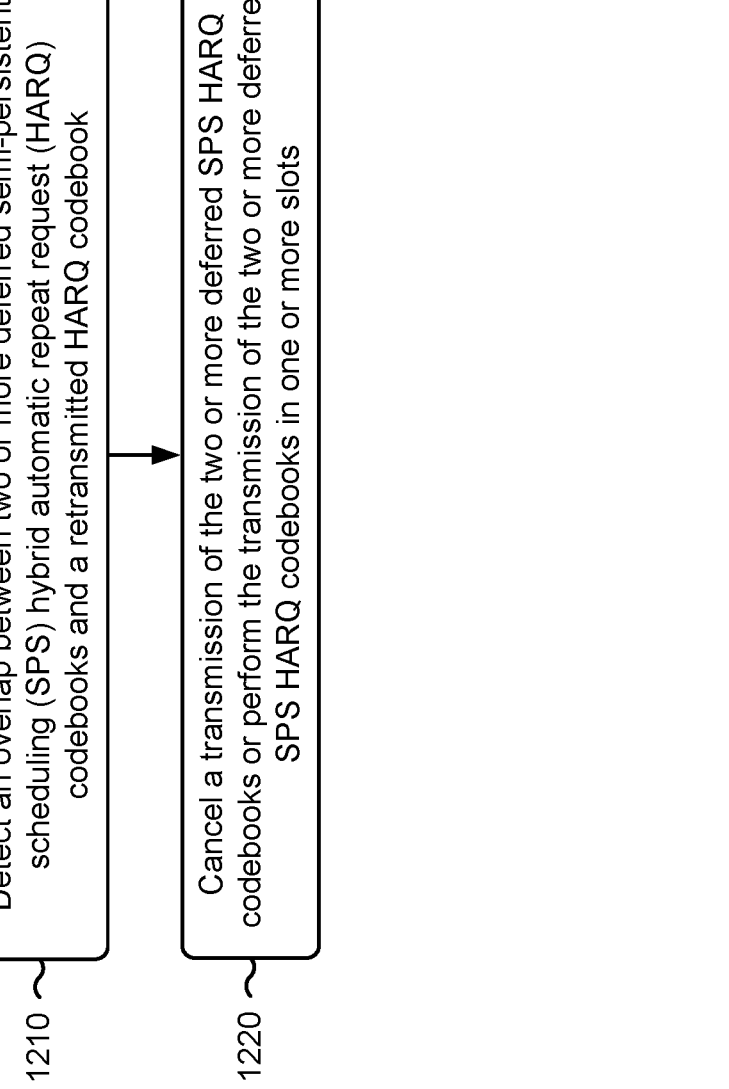

FIG. 12 is a diagram illustrating an example process associated with HARQ codebook interaction, in accordance with the present disclosure.

Figure 13:
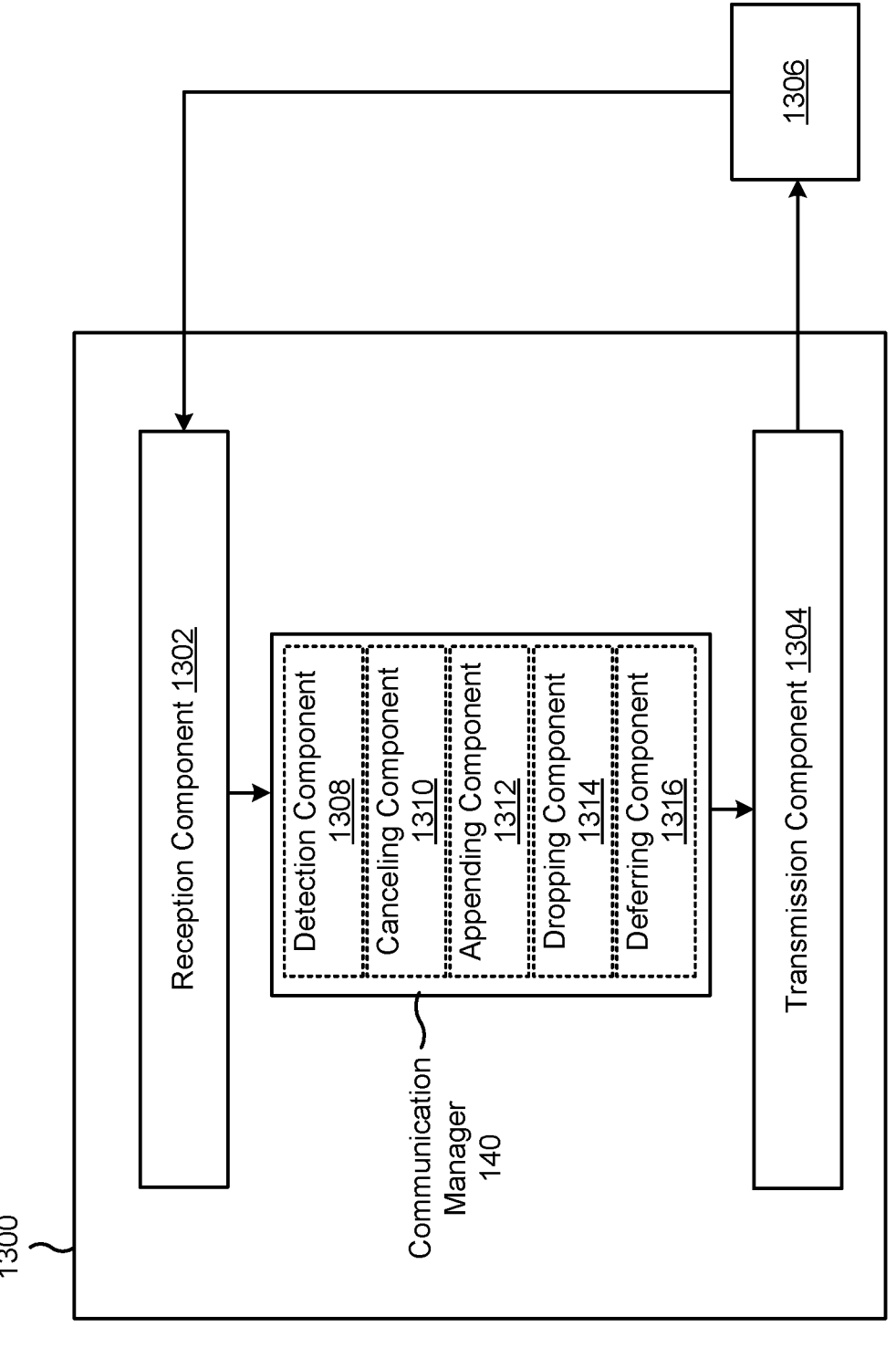

FIG. 13 is a diagram of an example apparatus for wireless communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
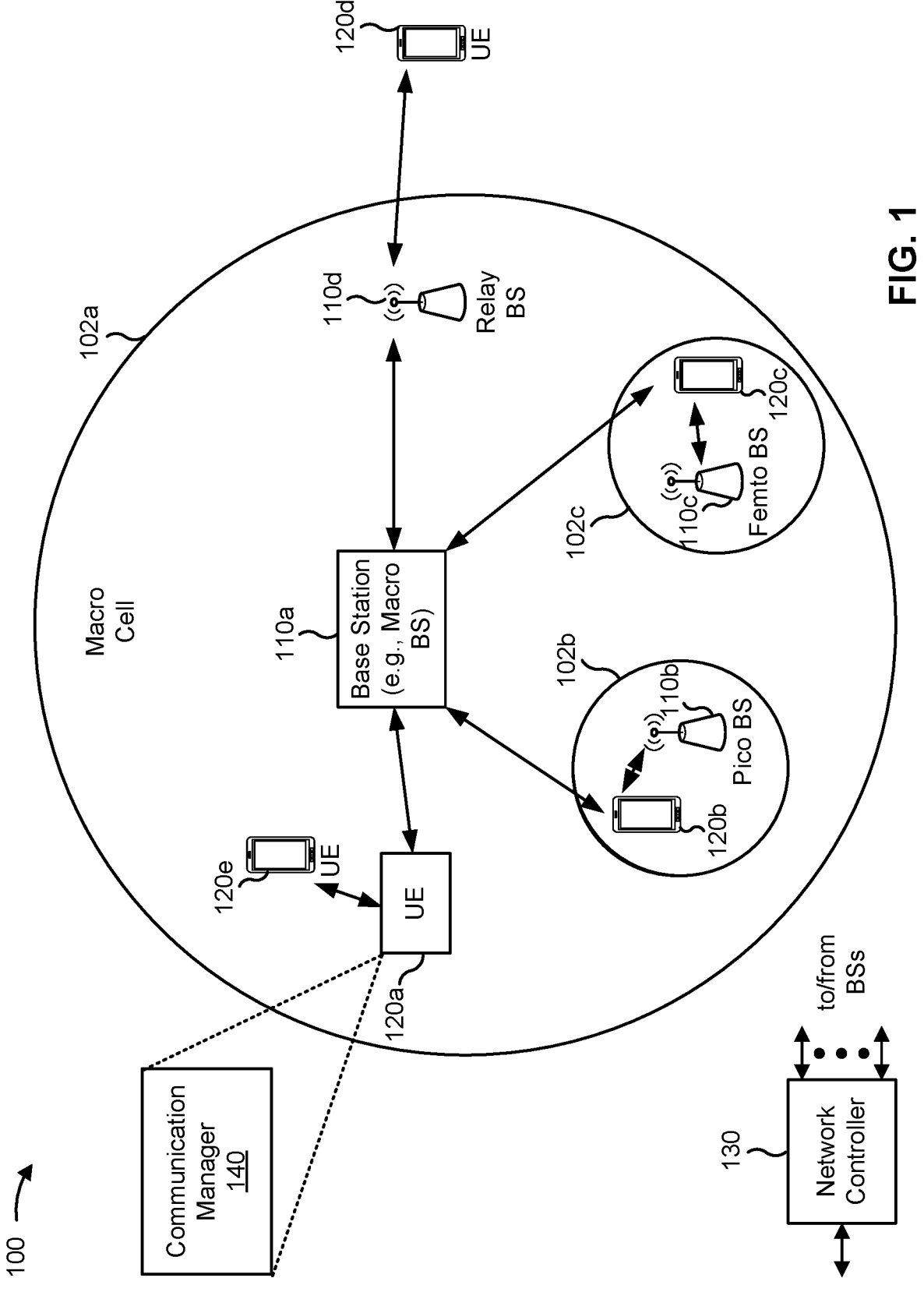
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link The base stations 110 may communicate with one another directly or indirectly via a wireless or wireline backhaul communication link The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), 1-R4 (52.6 GHz-114.25 GHz), and 1-R5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may detect an overlap between two or more deferred semi-persistent scheduling (SPS) hybrid automatic repeat request (HARQ) codebooks and a retransmitted HARQ codebook; and cancel a transmission of the two or more deferred SPS HARQ codebooks or perform the transmission of the two or more deferred SPS HARQ codebooks in one or more slots. Additionally, or alternatively, the communication manager 140 may perform one or more other operations described herein.

As indicated above, FIG. 1 is provided as an example. Other examples may differ from what is described with regard to FIG. 1.

Figure 2:
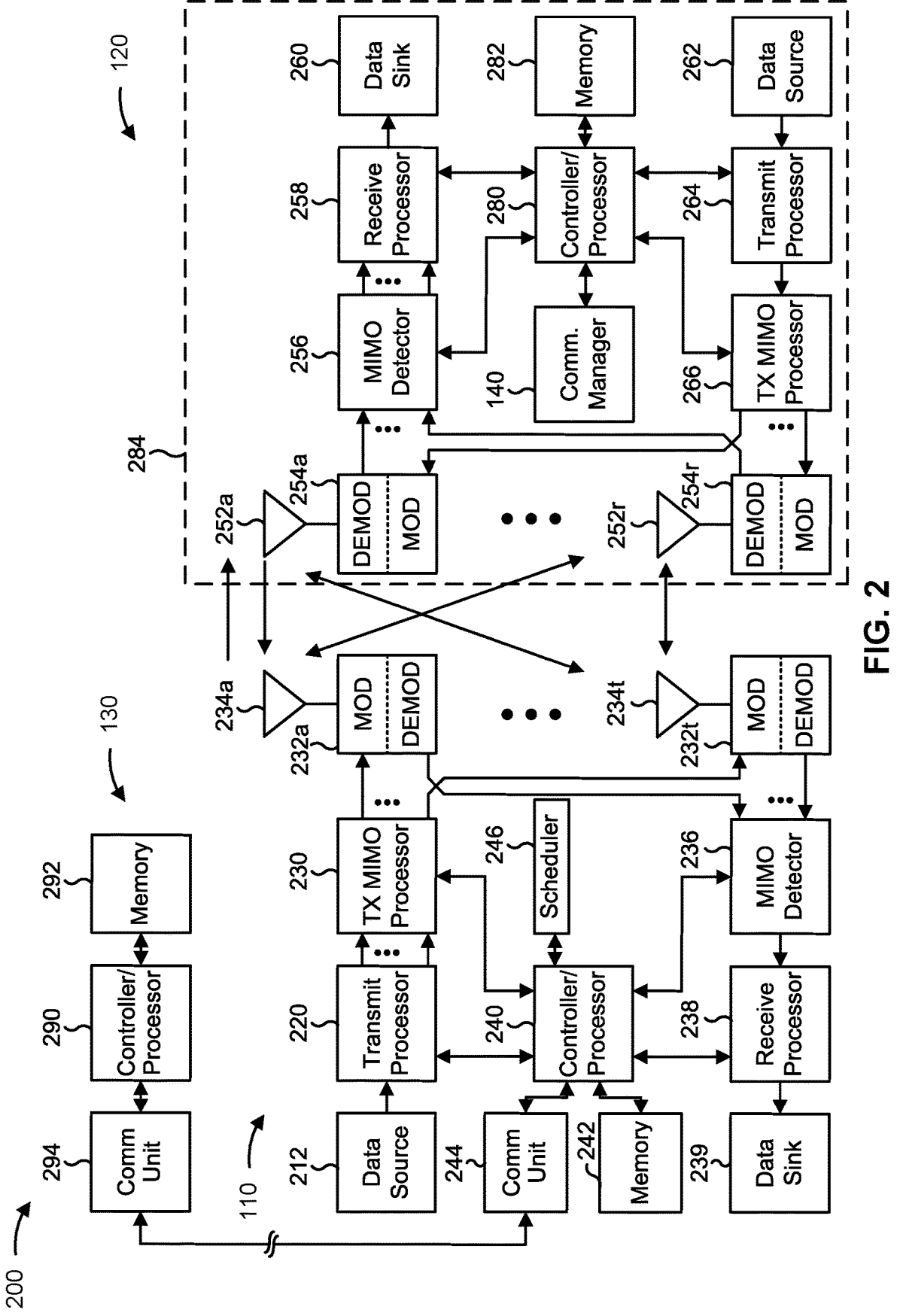
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s)

selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-13).

At the base station 110, the uplink signals from the UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-13).

The controller/processor 240 of the base station 110, the controller/processor 280 of the UE 120, and/or any other component(s) of FIG. 2 may perform one or more techniques associated with HARQ codebook interaction, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., the UE 120) includes means for detecting an overlap between two or more deferred SPS HARQ codebooks and a retransmitted HARQ codebook; and/or means for canceling a transmission of the two or more deferred SPS HARQ codebooks or performing the transmission of the two or more deferred SPS HARQ codebooks in one or more slots. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
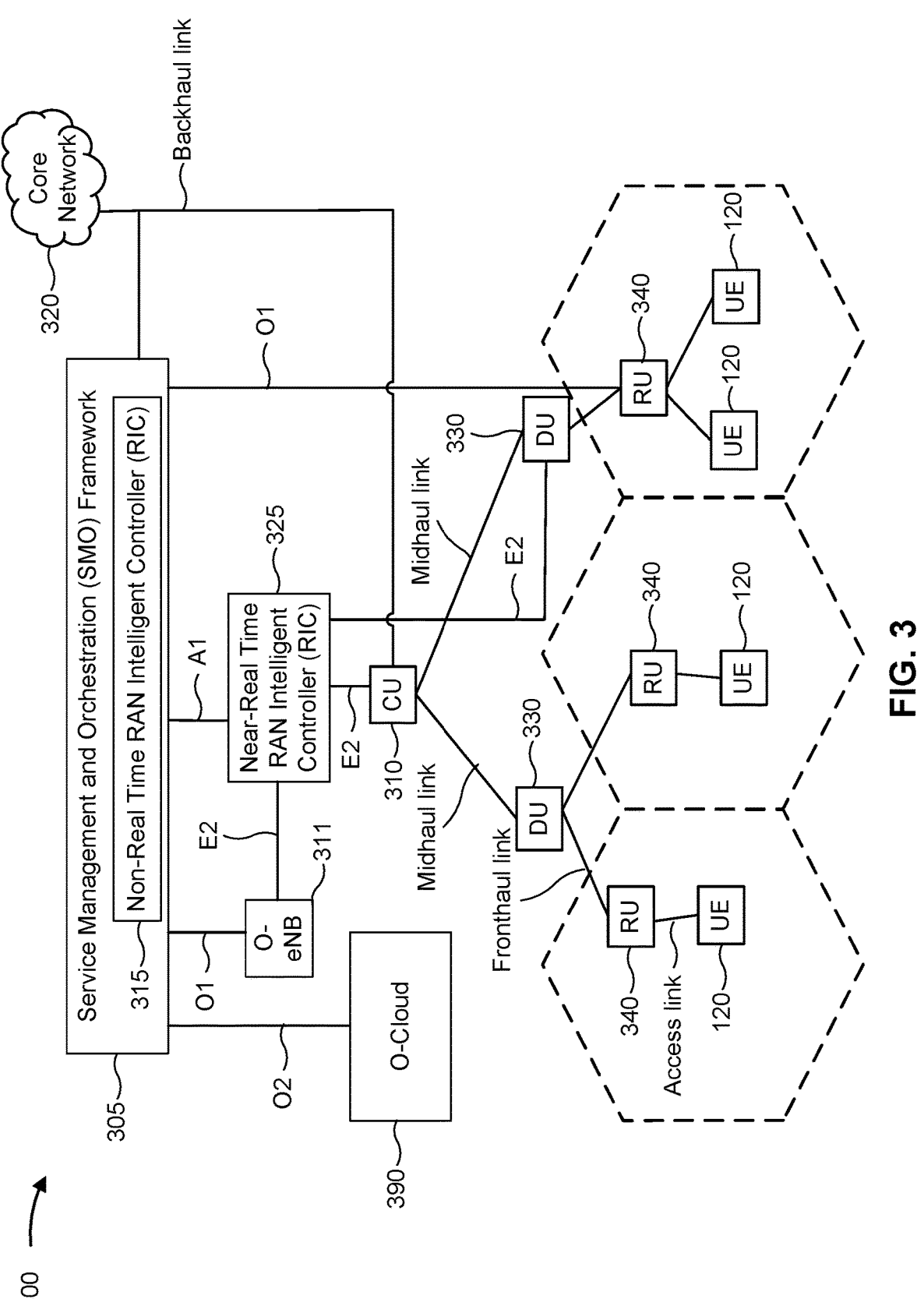
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance For example, the non-RT RIC 315 may monitor long-term trends and patterns for performance and employ AI/ML models to perform corrective actions through the SMO Framework 305 (such as reconfiguration via O1) or via creation of RAN management policies (such as AI policies).

As indicated above, FIG. 3 is provided as an example. Other examples may differ from what is described with regard to FIG. 3.

Figure 4:
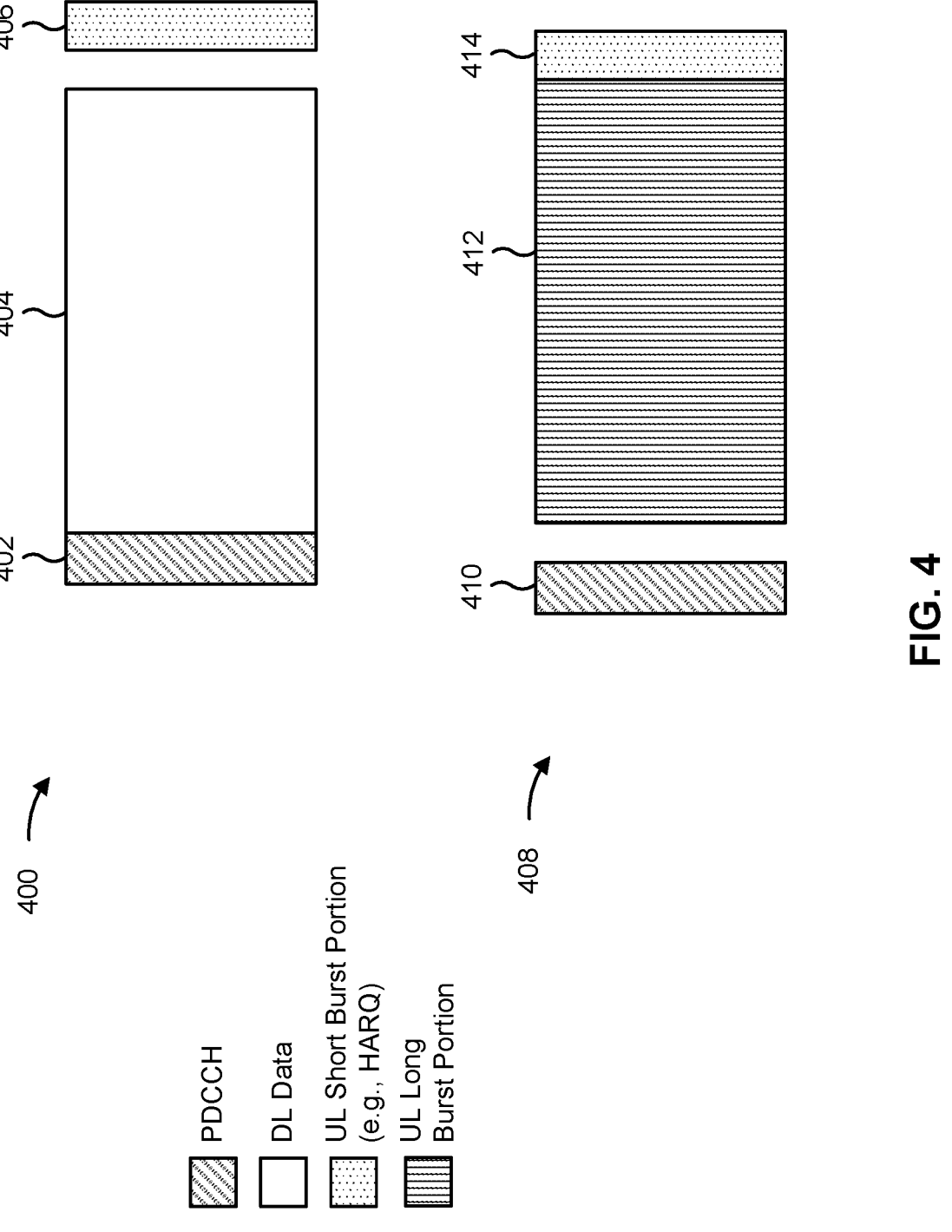
FIG. 4 is a diagram illustrating an example of a downlink-centric slot or communication structure and an uplink-centric slot or communication structure, in accordance with the present disclosure.

FIG. 4 is a diagram showing an example downlink (DL)-centric slot or communication structure 400 and an uplink (UL)-centric slot or communication structure 408, in accordance with of the present disclosure. The DL-centric slot (or wireless communication structure) 400 may include a control portion 402 during which the scheduling entity (for example, UE or BS) transmits various scheduling information or control information corresponding to various portions of the DL-centric slot to the subordinate entity (for example, UE). The control portion 402 may exist in the initial or beginning portion of the DL-centric slot 400. In some configurations, the control portion 402 may be a physical DL control channel PDCCH, as indicated in FIG. 4. In some aspects, the control portion 402 may include legacy PDCCH information, shortened PDCCH (sPDCCH) information), a control format indicator (CFI) value (for example, carried on a physical control format indicator channel (PC-FICH)), one or more grants (for example, downlink grants, or uplink grants), among other examples, or combinations thereof.

The DL-centric slot 400 may also include a DL data portion 404 during which the scheduling entity (for example, UE or BS) transmits DL data to the subordinate entity (for example, UE) using communication resources utilized to communicate DL data. The DL data portion 404 may sometimes be referred to as the payload of the DL-centric slot 400. In some configurations, the DL data portion 404 may be a physical downlink shared channel (PDSCH).

The DL-centric slot 400 may also include an UL short burst portion 406 during which the subordinate entity (for example, UE) transmits reference signals or feedback to the scheduling entity (for example, UE or BS) using communication resources utilized to communicate UL data. The UL short burst portion 406 may sometimes be referred to as an UL burst, an UL burst portion, a common UL burst, a short burst, an UL short burst, a common UL short burst, a common UL short burst portion, or various other suitable terms. In some aspects, the UL short burst portion 406 may include one or more reference signals. Additionally or alternatively, the UL short burst portion 406 may include feedback information corresponding to various other portions of the DL-centric slot 400. For example, the UL short burst portion 406 may include feedback information corresponding to the control portion 402 or the data portion 404. Non-limiting examples of information that may be included in the UL short burst portion 406 include an acknowledgement (ACK) signal (for example, a physical uplink control channel (PUCCH) ACK, a physical uplink shared channel (PUSCH) ACK, or an immediate ACK), a negative acknowledgement (NACK) signal (for example, a PUCCH NACK, a PUSCH NACK, or an immediate NACK), a scheduling request (SR), a buffer status report (BSR), a hybrid automatic repeat request (HARQ) indicator, a channel state indication (CSI), a channel quality indicator (CQI), a sounding reference signal (SRS), a demodulation reference signal (DMRS), PUSCH data, or various other suitable types of information. The UL short burst portion 406 may include additional or alternative information, such as information pertaining to random access channel (RACH) procedures, scheduling requests, and various other suitable types of information. In some cases, the HARQ indicator may be associated with a HARQ codebook. The HARQ codebook may be used by the UE 120 to provide feedback to a network node. For example, a network node may perform a DL data transmission (e.g., via the PDSCH), and the UE 120 may transmit an ACK message or a NACK message (e.g., via the PUSCH or PUCCH) using one or more HARQ processes of the HARQ codebook.

As illustrated in FIG. 4, the end of the DL data portion 404 may be separated in time from the beginning of the UL short burst portion 406. This time separation may sometimes be referred to as a gap, a guard period, a guard interval, or various other suitable terms. This separation provides time for the switch-over from DL communication (for example, reception operation by the subordinate entity (for example, BS or UE)) to UL communication (for example, transmission by the subordinate entity (for example, UE)). The foregoing provides some examples of a DL-centric wireless communication structure, but alternative structures having similar features may exist without deviating from the aspects described herein.

The UL-centric slot (or wireless communication structure) 408 may include a control portion 410. The control portion 410 may exist in the initial or beginning portion of the UL-centric slot 408. The control portion 410 in may be similar to the control portion 402 described above with reference to the DL-centric slot 400. The UL-centric slot 408 may also include an UL long burst portion 412. The UL long burst portion 412 may sometimes be referred to as the payload of the UL-centric slot 408. "UL portion" may refer to the communication resources utilized to communicate UL data from the subordinate entity (for example, UE) to the scheduling entity (for example, UE or BS). In some configurations, the control portion 410 may be a physical DL control channel PDCCH.

As illustrated, the end of the control portion 410 may be separated in time from the beginning of the UL long burst portion 412. This time separation may sometimes be referred to as a gap, guard period, guard interval, or various other suitable terms. This separation provides time for the switch-over from DL communication (for example, reception operation by the scheduling entity) to UL communication (for example, transmission operation by the scheduling entity).

The UL-centric slot 408 may also include an UL short burst portion 414. The UL short burst portion 414 may be similar to the UL short burst portion 406 described above with reference to the DL-centric slot 400, and may include any of the information described above. The foregoing is merely one example of an UL-centric wireless communication structure, and alternative structures having similar features may exist without deviating from the aspects described herein.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

In some cases, a deferred SPS HARQ codebook may overlap with a retransmitted HARQ codebook. For example, the deferred SPS HARQ codebook and the retransmitted HARQ codebook may be scheduled in the same UL resource. Additional details regarding this feature are described below.

As indicated above, FIG. 4 is provided as an example. Other examples may differ from what is provided with regard to FIG. 4.

Figure 5A:
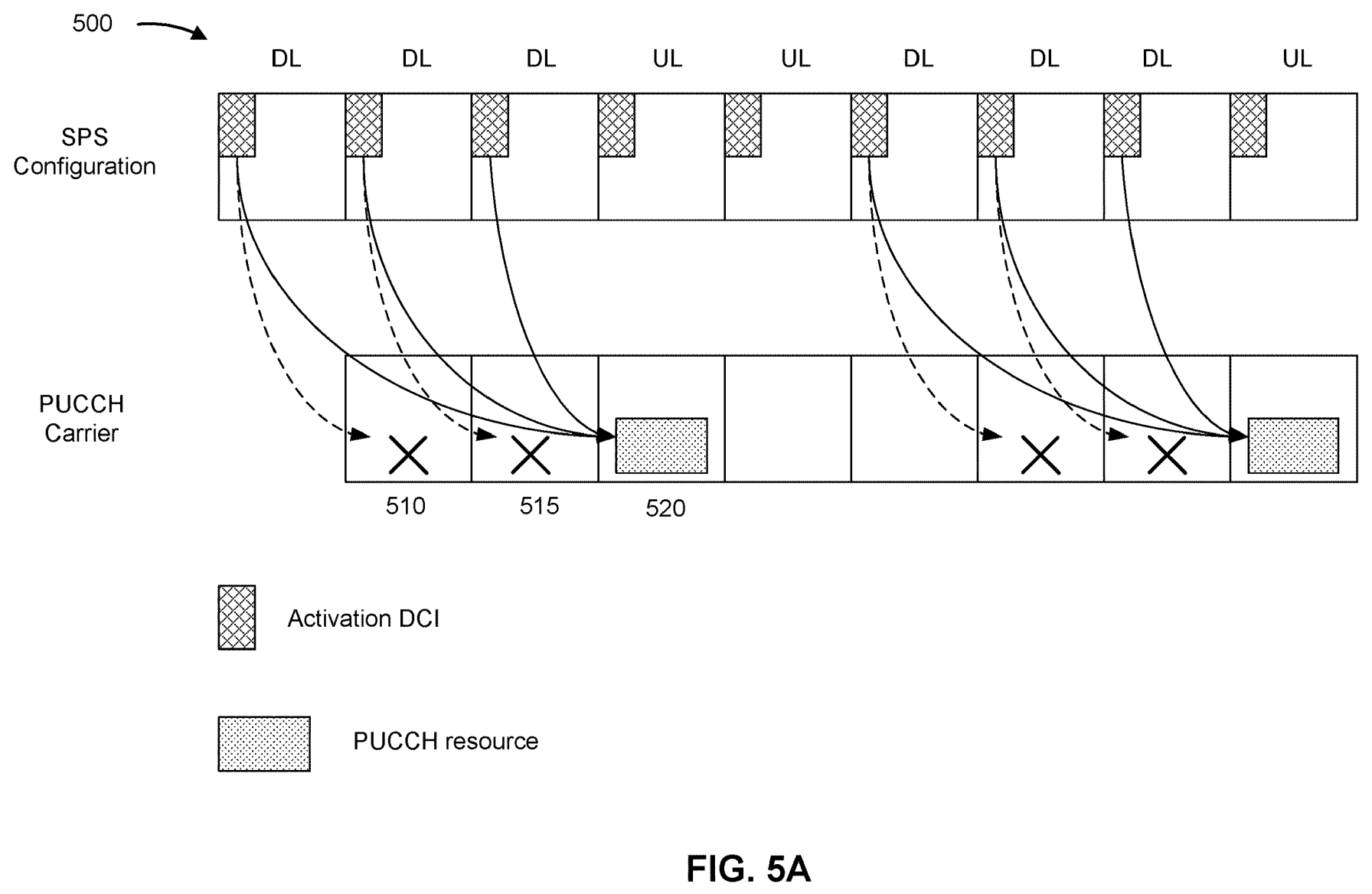
Figure 5B:
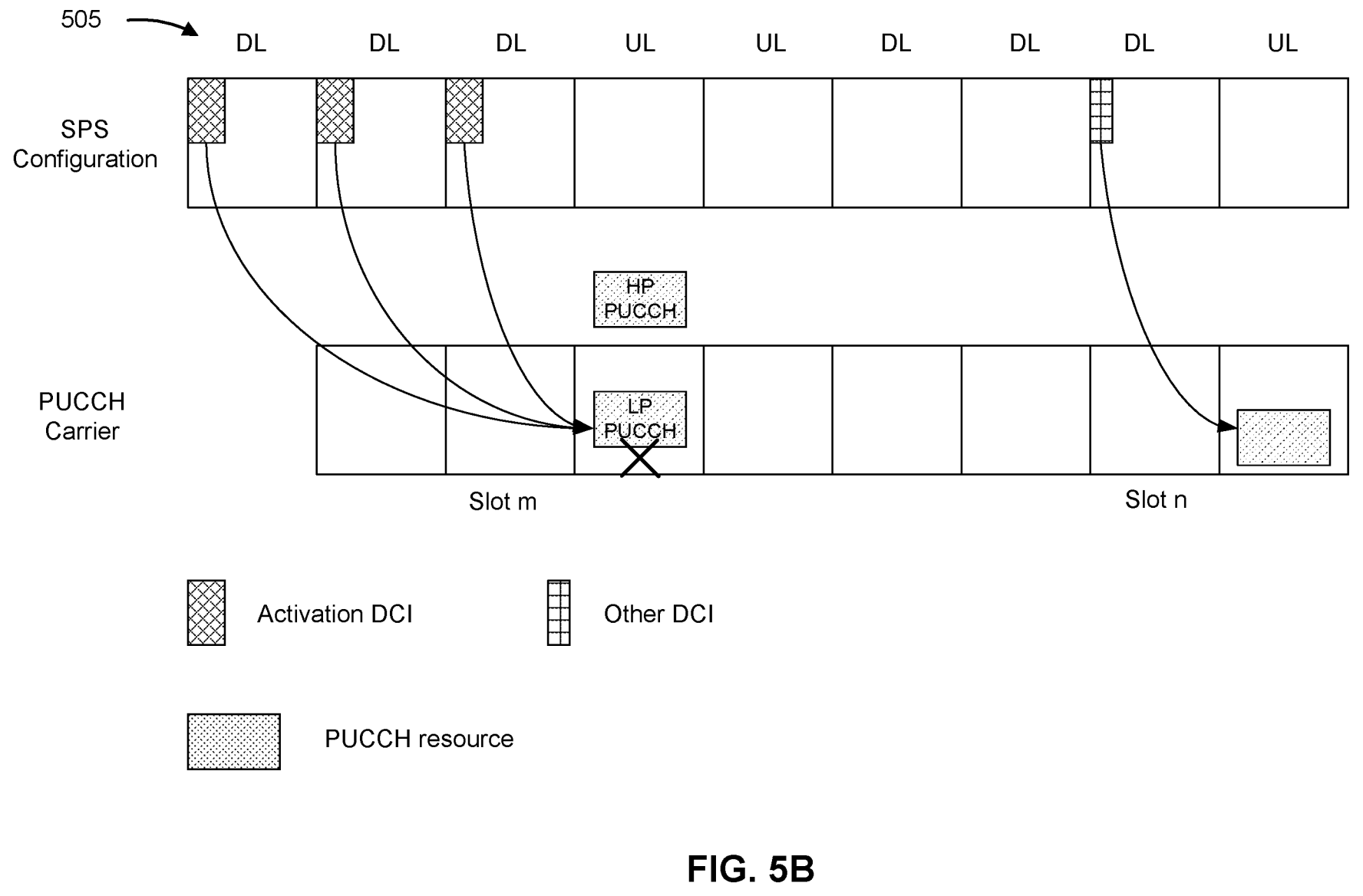

FIGS. 5A and 5B are diagrams illustrating an example 500 of a deferred semi-persistent scheduling (SPS) HARQ codebook and an example 505 of a retransmitted HARQ codebook, respectively, in accordance with the present disclosure.

As shown in FIG. 5A, downlink SPS may be supported for periodic traffic. For example, the UE 120 may receive an SPS configuration via an RRC message transmitted by a network node (e.g., the base station 110). The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions for the UE 120. The SPS configuration may also configure HARQ feedback resources for the UE 120 to transmit HARQ feedback for SPS PDSCH communications received in the SPS occasions. In some cases, the UE 120 may be configured with periodic PUCCH resources to report the HARQ feedback for the SPS PDSCHs.

In some cases (e.g., as described in Release 15 and Release 16 of the 3GPP specifications), for time division duplexing (TDD) systems, if a slot that is scheduled for reporting the HARQ feedback for the SPS is a downlink slot, or if any of the symbols for the scheduled PUCCH carrying the HARQ feedback is a downlink symbol, the UE 120 may not transmit the HARQ feedback. In some cases, this may result in wasted system resources, for example, since the network node may need to retransmit the SPS PDSCH due to the missed HARQ feedback. As shown in the example 500, the slot 510 and the slot 515 of the PUCCH carrier may be scheduled for reporting the HARQ feedback for the SPS. However, the slot 510 and the slot 515 of the PUCCH carrier may be downlink slots. Thus, the UE 120 may not transmit the HARQ feedback in the slot 510 or the slot 515. Therefore, the HARQ feedback may go unreported.

In some cases (e.g., as described in Release 17 of the 3GPP specifications), the HARQ feedback transmission may be delayed to one or more other uplink symbols or slots. This may be referred to as deferring the HARQ feedback for SPS PDSCH, and the corresponding HARQ bit(s) that get deferred may be referred to as the deferred SPS HARQ feedback or the deferred SPS HARQ codebook. As shown in the example 500, the UE 120 may be configured to defer the HARQ feedback until the next uplink slot (or any future uplink slot). For example, the slot 510 and the slot 515 of the PUCCH carrier may be downlink slots. Thus, the UE 120 may transmit the HARQ feedback in the slot 520, which is scheduled for the uplink In some cases, the UE 120 may transmit multiple HARQ feedback indicators in the same uplink slot, such as HARQ feedback that was deferred from the slot 510 and HARQ feedback that was deferred from the slot 515, as well as the other HARQ information, such as a HARQ feedback that was originally scheduled for the slot 520.

As shown in FIG. 5B, HARQ feedback that is scheduled to be transmitted in a slot may be dropped or cancelled due to a conflict with a downlink symbol, or due to an overlapping with another uplink transmission of a higher priority. In some cases, a high priority (HP) transmission (e.g., an uplink transmission that is associated with a priority index 1) may conflict with a low priority (LP) transmission (e.g., an uplink transmission that is associated with a priority index 0). In this case, the network node may transmit downlink control information (DCI) (e.g., DCI format 1_1/1_2) to trigger the UE 120 to retransmit the HARQ codebook in another slot. As shown in the example 505, the HARQ transmission in the slot m may be dropped or cancelled, such as because of a conflict with a downlink symbol or a higher priority uplink transmission. The network node may transmit DCI that indicates for the UE 120 to retransmit the HARQ codebook that was dropped in slot n+k, where k is signaled in the DCI. In some cases, the DCI may trigger an initial SPS transmission and, therefore, may be transmitted prior to the initial SPS transmission. The UE 120 may perform one or more other SPS transmissions without receiving additional DCI.

As described in more detail below, if a deferred SPS HARQ codebook transmission overlaps with a HARQ codebook retransmission, the UE 120 may append the deferred SPS HARQ codebook to the HARQ codebook retransmission.

As indicated above, FIGS. 5A and 5B are provided as an example. Other examples may differ from what is provided with regard to FIGS. 5A and 5B.

Figure 6:
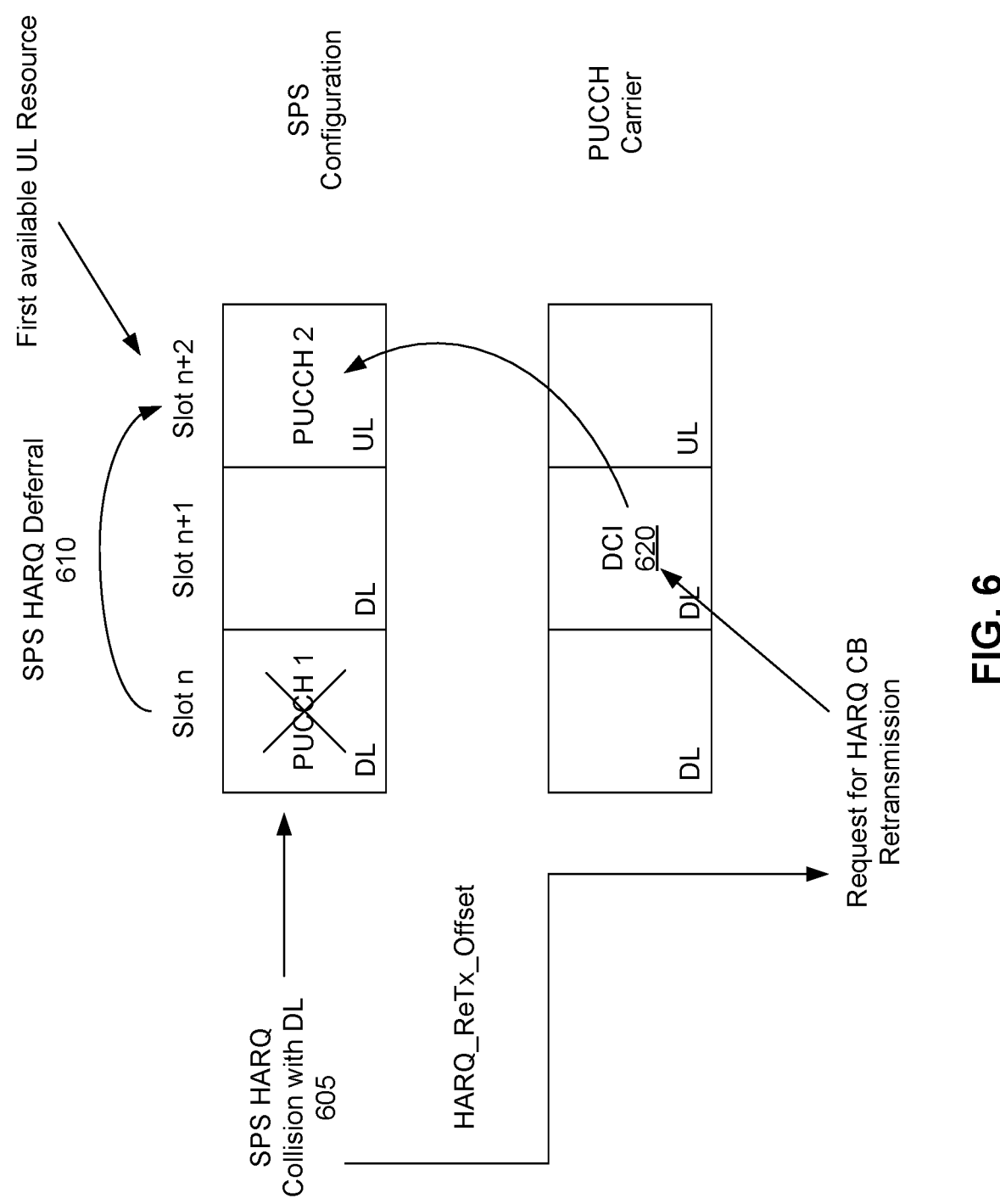
FIG. 6 is a diagram illustrating an example of an overlap between a deferred SPS HARQ codebook and a retransmitted HARQ codebook, in accordance with the present disclosure.

FIG. 6 is a diagram illustrating an example 600 of an overlap between a deferred SPS HARQ codebook and a retransmitted HARQ codebook, in accordance with the present disclosure.

In some cases, for one-shot HARQ codebook retransmission via the PUCCH, the triggering DCI may dynamically indicate an offset (e.g., HARQ_retx_offset) which may be used to define the offset between the PUCCH slot (or sub-slot) of the triggering DCI and the PUCCH slot (or sub-slot) of the HARQ codebook to be retransmitted. In some cases, if the PUCCH slot indicated by the HARQ_retx_offset is the target or earliest slot for a deferred SPS HARQ codebook transmission, the HARQ codebook (including the deferred SPS HARQ codebook bits) may be retransmitted in a PUCCH (e.g., a retransmission PUCCH) indicated by the one-shot triggering DCI. In some cases, the PUCCH slot that includes the retransmitted HARQ codebook (e.g., the one-shot triggered HARQ codebook) may be regarded as a valid potential target PUCCH slot for the deferred SPS HARQ codebook. In some cases, a priority (e.g., PHY priority) for the deferred SPS HARQ codebook may be the same as a priority for the retransmitted HARQ codebook.

As shown in the example 600, a transmission of an SPS HARQ codebook may initially be scheduled for a slot n. However, the slot n may be a DL slot, thereby resulting in an SPS HARQ collision with the DL (as shown by reference number 605). Thus, the UE 120 may cancel the transmission of the SPS HARQ codebook. In some aspects, canceling a transmission of a HARQ codebook in a slot may mean not performing the transmission, or withholding the transmission, of the HARQ codebook in the slot. In some aspects, the transmission of the HARQ codebook may be deferred to another slot (e.g., the HARQ codebook may be transmitted in the other slot). For example, the UE 120 may cancel the transmission of the SPS HARQ codebook at the slot n and may defer the transmission of the SPS HARQ codebook (as shown by reference number 610) by an offset. For example, the transmission of the SPS HARQ codebook may be deferred by two slots to slot n+2. However, after the SPS HARQ codebook deferral (at slot n), but prior to the transmission of the deferred SPS HARQ codebook (at slot n+2), the UE 120 may receive DCI 620 that indicates for the UE 120 to perform a HARQ codebook retransmission at the slot n+2. Thus, both the deferred SPS HARQ codebook and the retransmitted HARQ codebook may be scheduled at the slot n+2. In some cases, if the PUCCH slot with the one-shot triggered HARQ codebook is determined by the UE 120 as the target or earliest PUCCH slot for SPS HARQ codebook deferral, the deferred SPS HARQ codebook in the target slot may be appended to the retransmitted HARQ codebook. For example, the deferred SPS HARQ codebook may be appended to the retransmitted HARQ codebook, and both the deferred SPS HARQ codebook and the retransmitted HARQ codebook may be transmitted at the slot n+2. However, this may result in wasted resources and increased signaling overhead, since the HARQ bits included in the deferred SPS HARQ codebook and the HARQ bits included in the retransmitted HARQ codebook may be the same HARQ bits. Thus, the HARQ information may be transmitted multiple times in the same slot (or in nearby slots).

Techniques and apparatuses are described herein for HARQ codebook interaction. In some aspects, the UE 120 may detect an overlap between two or more deferred SPS HARQ codebooks and a retransmitted HARQ codebook. For example, the UE 120 may determine that the two or more deferred SPS HARQ codebooks and the retransmitted HARQ codebook are scheduled in the same slot. The UE 120 may cancel the transmission of the two or more deferred SPS HARQ codebooks, or may perform the transmission of the two or more deferred SPS HARQ codebooks in one or more slots. In some aspects, the one or more slots may be, or may include, the same slot in which the two or more deferred SPS HARQ codebook transmissions overlap. In some other aspects, the one or more slots may be, or may include, a different slot than the slot in which the two or more deferred SPS HARQ codebook transmissions overlap. In one example, detecting the overlap between the two or more deferred SPS HARQ codebooks and the retransmitted HARQ codebook may include detecting an overlap between a first deferred SPS HARQ codebook, a second deferred SPS HARQ codebook, and the retransmitted HARQ codebook. The UE may transmit one or more bits of the second deferred SPS HARQ codebook via the retransmitted HARQ codebook, and may append one or more bits of the first deferred SPS HARQ codebook to the retransmitted HARQ codebook. Alternatively, the UE may transmit one or more bits of the first deferred SPS HARQ codebook and one or more bits of the second deferred SPS HARQ codebook via the retransmitted HARQ codebook. This may reduce a number of wasted resources and/or may reduce signaling overhead, for example, by reducing a number of duplicate HARQ bits that are transmitted in the same slot or in nearby slots.

As indicated above, FIG. 6 is provided as an example. Other examples may differ from what is provided with regard to FIG. 6.

Figure 7:
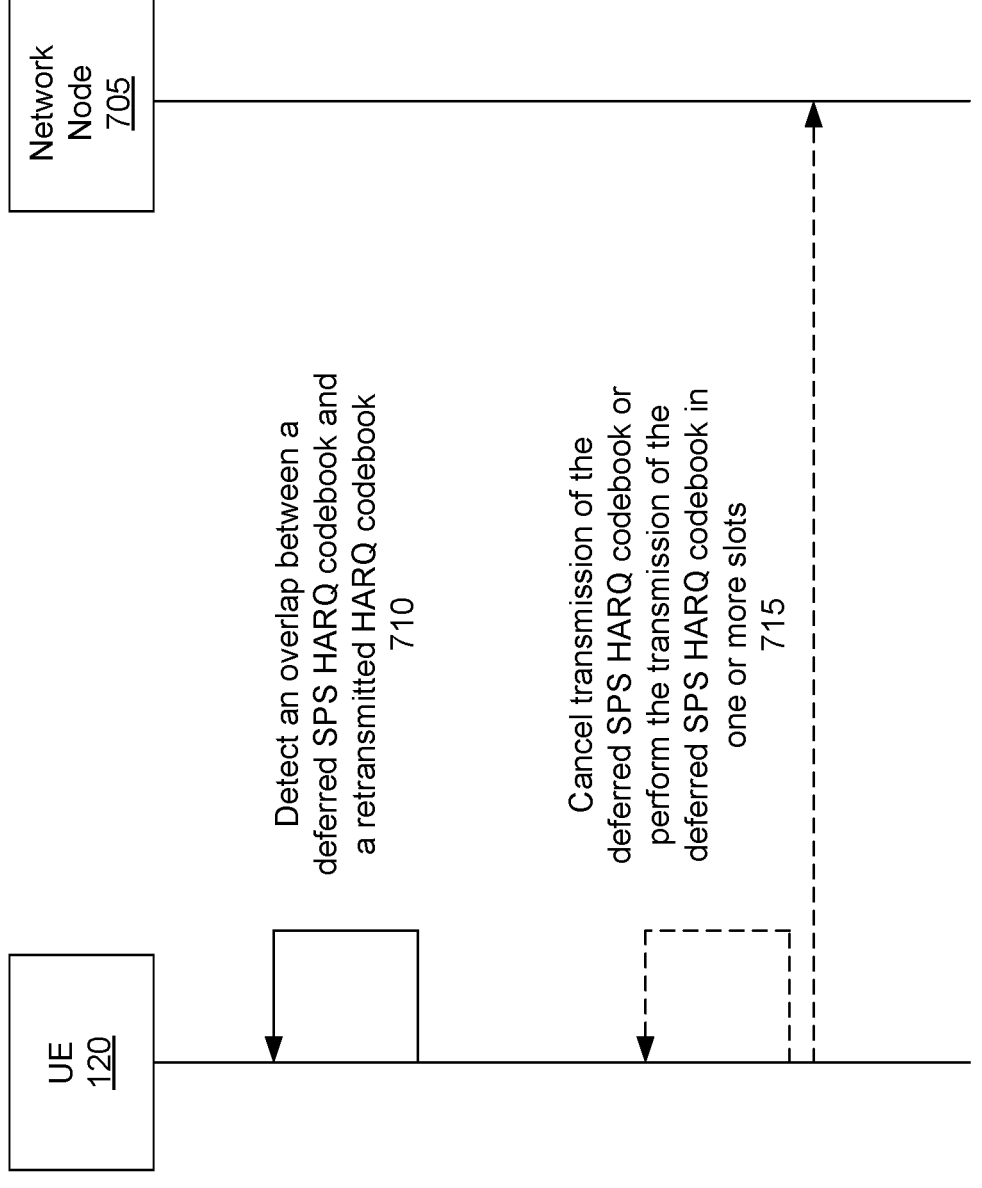
FIG. 7 is a diagram illustrating an example associated with HARQ codebook interaction, in accordance with the present disclosure.

FIG. 7 is a diagram illustrating an example 700 of HARQ codebook interaction, in accordance with the present disclosure. The UE 120 may communicate with a network node, such as the network node 705. The network node 705 may include some or all of the features of the base station 110, the CU 310, the DU 330, and/or the RU 340 described herein.

As shown in connection with reference number 710, the UE 120 may detect an overlap between a deferred SPS HARQ codebook and a retransmitted HARQ codebook.

In some aspects, the UE 120 may defer the transmission of the SPS HARQ codebook. For example, as described above, the UE 120 may defer the SPS HARQ codebook transmission by an offset, such as from a slot n to a slot n+2. However, at a time that is after the SPS HARQ codebook deferral, but prior to the transmission of the deferred SPS HARQ codebook, the UE 120 may receive DCI that indicates to perform a retransmission of the HARQ codebook. In some aspects, the DCI may indicate for the UE 120 to retransmit the HARQ codebook in the same slot that is scheduled for the deferred SPS HARQ codebook transmission. Thus, both the deferred SPS HARQ codebook and the retransmitted HARQ codebook may be scheduled in the slot n+2. In this case, the UE 120 may detect the overlap between the deferred SPS HARQ codebook and the retransmitted HARQ codebook in the slot n+2.

In some aspects, the overlap between the deferred SPS HARQ codebook and the retransmitted HARQ codebook may occur in different slots. For example, the UE 120 may defer the SPS HARQ codebook transmission (by the offset) to the slot n+2. However, at a time that is after the SPS HARQ codebook deferral, but prior to the deferred SPS HARQ codebook transmission, the UE 120 may receive DCI that indicates to perform a retransmission of the HARQ codebook at a slot n+3. In this case, the UE 120 may detect the overlap between the deferred SPS HARQ codebook that is scheduled in the slot n+2 and the retransmitted HARQ codebook that is scheduled in the slot n+3.

As shown in connection with reference number 715, the UE 120 may cancel a transmission of the deferred SPS HARQ codebook, or may perform the transmission of the deferred SPS HARQ codebook in a different slot than a slot that is to be used for the retransmitted HARQ codebook.

In a first example, the UE 120 may cancel the deferred SPS HARQ codebook transmission. In this example, the deferred SPS HARQ codebook may be scheduled in the slot n+2, and the retransmitted HARQ codebook may be scheduled in the slot n+3. The slot n+2 may correspond to the first available PUCCH. The UE 120 may cancel or stop the transmission of the deferred SPS HARQ codebook in the slot n+2, and may perform the HARQ codebook retransmission in the slot n+3. Thus, the UE 120 may ignore the first available PUCCH at the slot n+2. Additional details regarding these features are described in connection with FIG. 8.

In a second example, the UE 120 may transmit the deferred SPS HARQ codebook in the different slot than the slot that is to be used for the retransmitted HARQ codebook. In this example, the deferred SPS HARQ codebook may be scheduled in the slot n+2, and the retransmitted HARQ codebook may be scheduled in the slot n+3. The slot n+2 may correspond to the first available PUCCH. The UE 120 may perform the transmission of the deferred SPS HARQ codebook in the slot n+2, and may perform the HARQ codebook retransmission in the slot n+3. Thus, the UE 120 may perform multiple (e.g., two) transmissions of the HARQ codebook. Additional details regarding these features are described in connection with FIG. 9.

In a third example, the UE 120 may detect an overlap between a first deferred SPS HARQ codebook, a second deferred SPS HARQ codebook, and the retransmitted HARQ codebook. Thus, detecting the overlap between the deferred SPS HARQ codebook and the retransmitted HARQ codebook may include detecting the overlap between the first deferred SPS HARQ codebook, the second deferred SPS HARQ codebook, and the retransmitted HARQ codebook. In this example, the first deferred SPS HARQ codebook may be deferred from a previous slot (e.g., slot n−2) to the slot n+2, and the second deferred SPS HARQ codebook may be deferred from the slot n to the slot n+2. In some aspects, after the SPS HARQ codebook deferral (e.g., after slot n), but prior to transmitting the first deferred SPS HARQ codebook and the second SPS HARQ codebook (at slot n+2), the UE 120 may receive DCI that indicates to perform a retransmission of the HARQ codebook. Thus, the first deferred SPS HARQ codebook, the second deferred SPS HARQ codebook, and the retransmitted HARQ codebook may be scheduled in the slot n+2. In this example, the slot n+2 includes the first available uplink resource. For example, the PUCCH in the slot n+2 is the first available PUCCH resource.

In some aspects, the UE 120 may transmit the second deferred SPS HARQ codebook via the PUCCH that is scheduled by the DCI. For example, the second deferred SPS HARQ codebook bits may be transmitted via the HARQ codebook retransmission. In this case, the first SPS HARQ codebook may be appended to the retransmitted HARQ codebook. In some aspects, since the second deferred SPS HARQ codebook bits are transmitted via the retransmitted HARQ codebook, the second deferred SPS HARQ codebook transmission may be canceled.

In some aspects, the UE 120 may transmit the first deferred SPS HARQ codebook and the second deferred SPS HARQ codebook via the PUCCH that is scheduled by the DCI. For example, the first deferred SPS HARQ codebook bits and the second deferred SPS HARQ codebook bits may be transmitted via the HARQ codebook retransmission. In some aspects, the first deferred SPS HARQ codebook bits may be transmitted prior to the second deferred SPS HARQ codebook bits. In some aspects, the second deferred SPS HARQ codebook bits may be transmitted prior to the first deferred SPS HARQ codebook bits. In some aspects, since the first deferred SPS HARQ codebook bits and the second deferred SPS HARQ codebook bits are transmitted via the retransmitted HARQ codebook, the first deferred SPS HARQ codebook transmission and the second deferred SPS HARQ codebook transmission may be canceled.

In some aspects, the UE 120 may transmit the first deferred SPS HARQ codebook and the second deferred SPS HARQ codebook in accordance with a PUCCH resource indicator (PRI). The PRI may be indicated by the DCI that triggers the HARQ codebook retransmission. The PRI may indicate an order for transmitting the first deferred SPS HARQ codebook and the second deferred SPS HARQ codebook. In some aspects, the PRI may indicate for the first deferred SPS HARQ codebook bits to be transmitted prior to the second deferred SPS HARQ codebook bits. In some cases, the PRI may indicate for the second deferred SPS HARQ codebook bits to be transmitted prior to the first deferred SPS HARQ codebook bits.

Additional details regarding these features are described in connection with FIG. 10.

In a fourth example, the UE 120 may detect the overlap between the first deferred SPS HARQ codebook, the second deferred SPS HARQ codebook, and the retransmitted HARQ codebook. In this example, the first deferred SPS HARQ codebook may be deferred from a previous slot (e.g., slot n−2) to the slot n+2, and the second deferred SPS HARQ codebook may be deferred from the slot n to the slot n+2. In some aspects, after the SPS HARQ codebook deferral (e.g., after slot n), but prior to transmitting the first deferred SPS HARQ codebook and the second SPS HARQ codebook (at slot n+2), the UE 120 may receive DCI that indicates to perform a retransmission of the HARQ codebook. Thus, the first deferred SPS HARQ codebook, the second deferred SPS HARQ codebook, and the retransmitted HARQ codebook may be scheduled in the slot n+2. In this example, the slot n+2 does not include the first available uplink resource. For example, the PUCCH in the slot n+2 is not the first available PUCCH resource.

In some aspects, the UE 120 may transmit the second deferred SPS HARQ codebook via the PUCCH that is scheduled by the DCI, and may drop the first deferred SPS HARQ codebook. For example, the second deferred SPS HARQ codebook bits may be transmitted via the HARQ codebook retransmission, and the first deferred SPS HARQ codebook bits may be dropped (e.g., not transmitted).

In some aspects, the UE 120 may transmit the second deferred SPS HARQ codebook via the PUCCH that is scheduled by the DCI, and may further defer the first deferred SPS HARQ codebook. For example, the second deferred SPS HARQ codebook bits may be transmitted via the HARQ codebook retransmission, and the first deferred SPS HARQ codebook bits may be further deferred (e.g., to a slot n+2+k).

Additional details regarding these features are described in connection with FIG. 11.

In some aspects, the UE 120 may receive information that indicates whether to cancel or transmit the deferred SPS HARQ codebook. For example, the UE 120 may receive an RRC message or a MAC message (e.g., a MAC control element) that indicates whether to cancel or transmit the deferred SPS HARQ codebook in accordance with the first example, the second example, the third example, the fourth example, or any of the sub-examples described herein.

In some aspects, the timeline for the UE 120 to cancel or stop the ongoing SPS HARQ deferral may be the same as the timeline for the UE 120 to cancel or stop the ongoing SPS HARQ deferral in the case of joint interaction between SPS HARQ deferral and Type 3 HARQ codebook retransmission. For example, when SPS HARQ deferral and Type 3 HARQ CB are jointly configured, and the UE 120 receives a request to transmit the Type 3 HARQ CB, one or more bits of the deferred SPS HARQ bits may be cancelled or dropped. In some cases, the UE 120 may need some time in order to drop the bits. As described above, this time may be the same time as the time that is needed for cancelling the uplink transmission (e.g., via the PUSCH). For example, this time may be equal to $T_{proc,2}$.

As described above, the deferred SPS HARQ codebook and the retransmitted HARQ codebook may be scheduled for the same slot. In some cases, the deferred SPS HARQ codebook may be appended to the retransmitted HARQ codebook. However, this may result in wasted resources and increased signaling overhead. Using the techniques and apparatuses described herein, the UE 120 may cancel the transmission of the deferred SPS HARQ codebook, or may perform the transmission of the deferred SPS HARQ codebook in a different slot than the slot that is to be used for the retransmitted HARQ codebook. Thus, the number of duplicate HARQ bits that are transmitted in the same slot may be reduced or eliminated.

As indicated above, FIG. 7 is provided as an example. Other examples may differ from what is provided with regard to FIG. 7.

Figure 8:
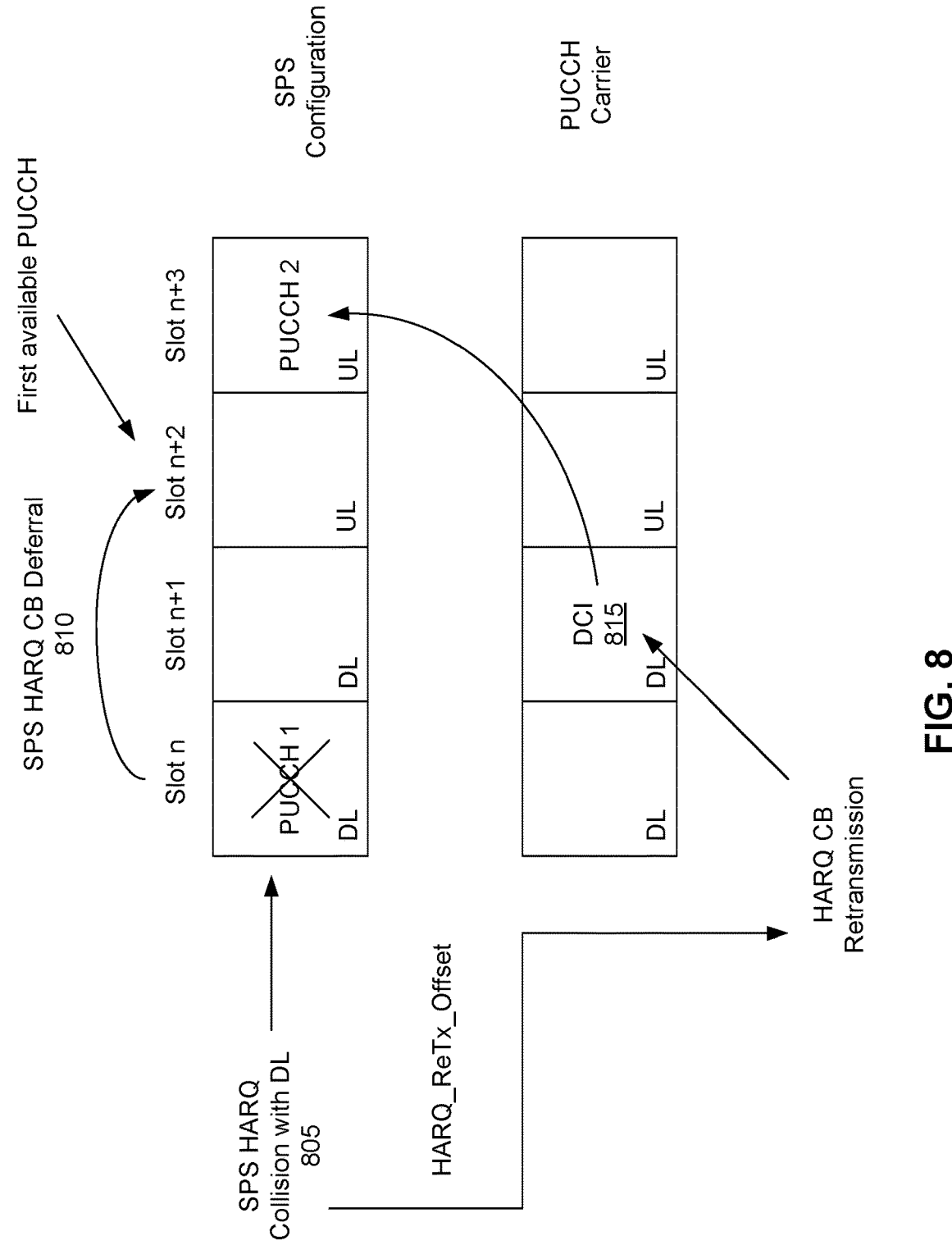
FIG. 8 is a diagram illustrating a first example associated with resolving a HARQ codebook interaction, in accordance with the present disclosure.

FIG. 8 is a diagram illustrating an example 800 of a first example for resolving a HARQ codebook interaction, in accordance with the present disclosure.

In some aspects, an SPS HARQ codebook transmission that is scheduled in slot n may be canceled. For example, the SPS HARQ codebook transmission that is scheduled in the slot n may be canceled due to the SPS HARQ collision with the DL (as shown by reference number 805). Instead, the SPS HARQ codebook transmission may be deferred by an offset (as shown by reference number 810). For example, the SPS HARQ codebook transmission may be deferred to the slot n+2. However, at a time that is after the SPS HARQ codebook deferral (after slot n), but prior to the transmission of the deferred SPS HARQ codebook (prior to slot n+2), the UE 120 may receive DCI 815 that indicates to perform a retransmission of the HARQ codebook at slot n+3. Thus, multiple transmissions of the HARQ bits may be scheduled. As described above in connection with FIG. 7, the UE 120 may cancel or stop the transmission of the deferred SPS HARQ codebook in the slot n+2, and may perform the HARQ codebook retransmission in the slot n+3 (e.g., via the PUCCH 2). In this example, the UE 120 may ignore the first available PUCCH at the slot n+2.

As indicated above, FIG. 8 is provided as an example. Other examples may differ from what is provided with regard to FIG. 8.

Figure 9:
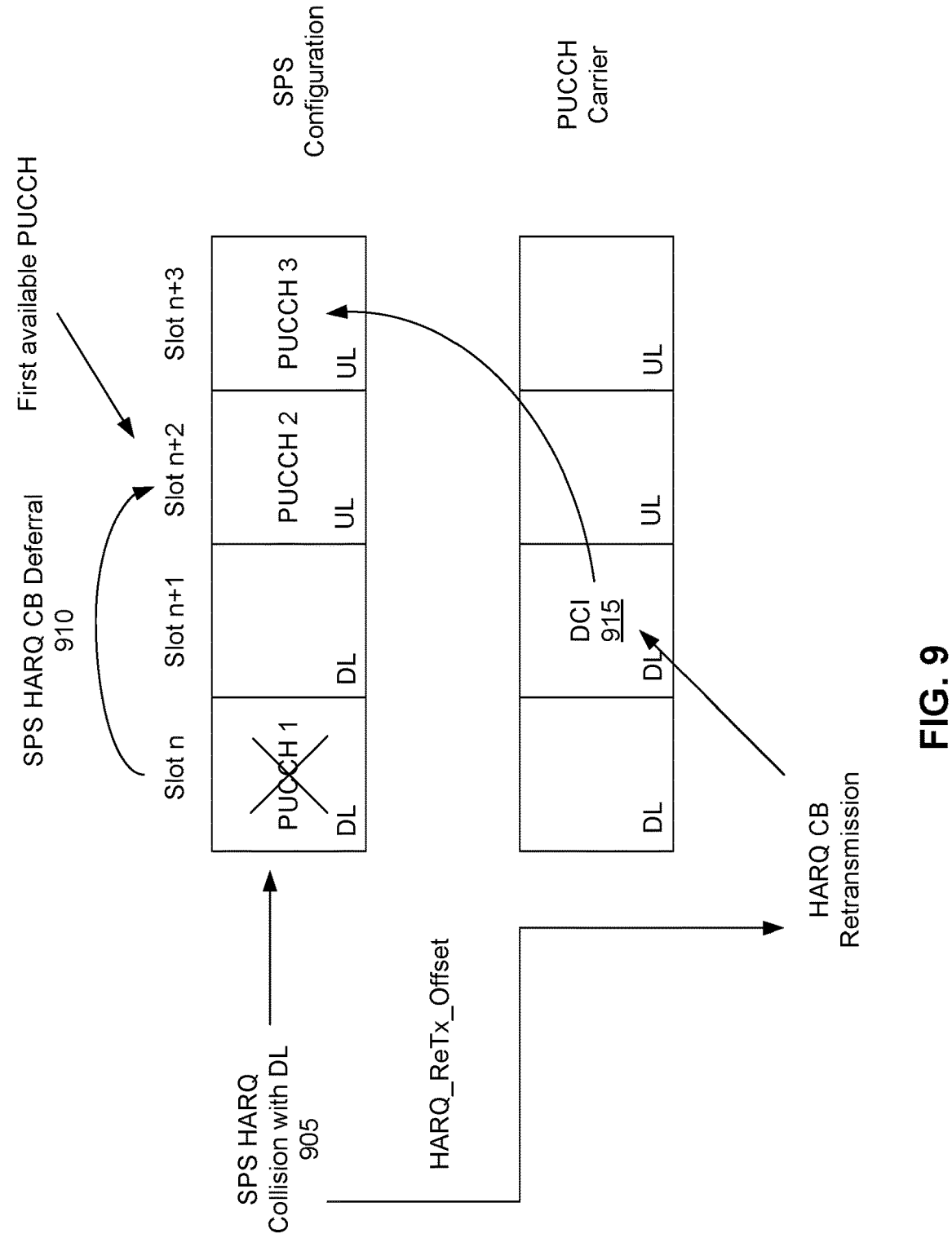
FIG. 9 is a diagram illustrating a second example associated with resolving a HARQ codebook interaction.

FIG. 9 is a diagram illustrating an example 900 of a second example for resolving a HARQ codebook interaction, in accordance with the present disclosure.

In some aspects, an SPS HARQ codebook transmission that is scheduled in slot n may be canceled. For example, the SPS HARQ codebook transmission that is scheduled in the slot n may be canceled due to the SPS HARQ collision with the DL (as shown by reference number 905). Instead, the SPS HARQ codebook transmission may be deferred by an offset (as shown by reference number 910). For example, the SPS HARQ codebook transmission may be deferred to the slot n+2. However, at a time that is after the SPS HARQ codebook deferral (after slot n), but prior to the transmission of the deferred SPS HARQ codebook (prior to slot n+2), the UE 120 may receive DCI 915 that indicates to perform a retransmission of the HARQ codebook at slot n+3 (e.g., via the PUCCH 2). As described above in connection with FIG. 7, the UE 120 may transmit the deferred SPS HARQ codebook in a different slot than the slot that is to be used for the retransmitted HARQ codebook. For example, the UE 120 may perform the deferred SPS HARQ codebook transmission in the slot n+2, and may perform the HARQ codebook retransmission in the slot n+3.

As indicated above, FIG. 9 is provided as an example. Other examples may differ from what is provided with regard to FIG. 9.

Figure 10:
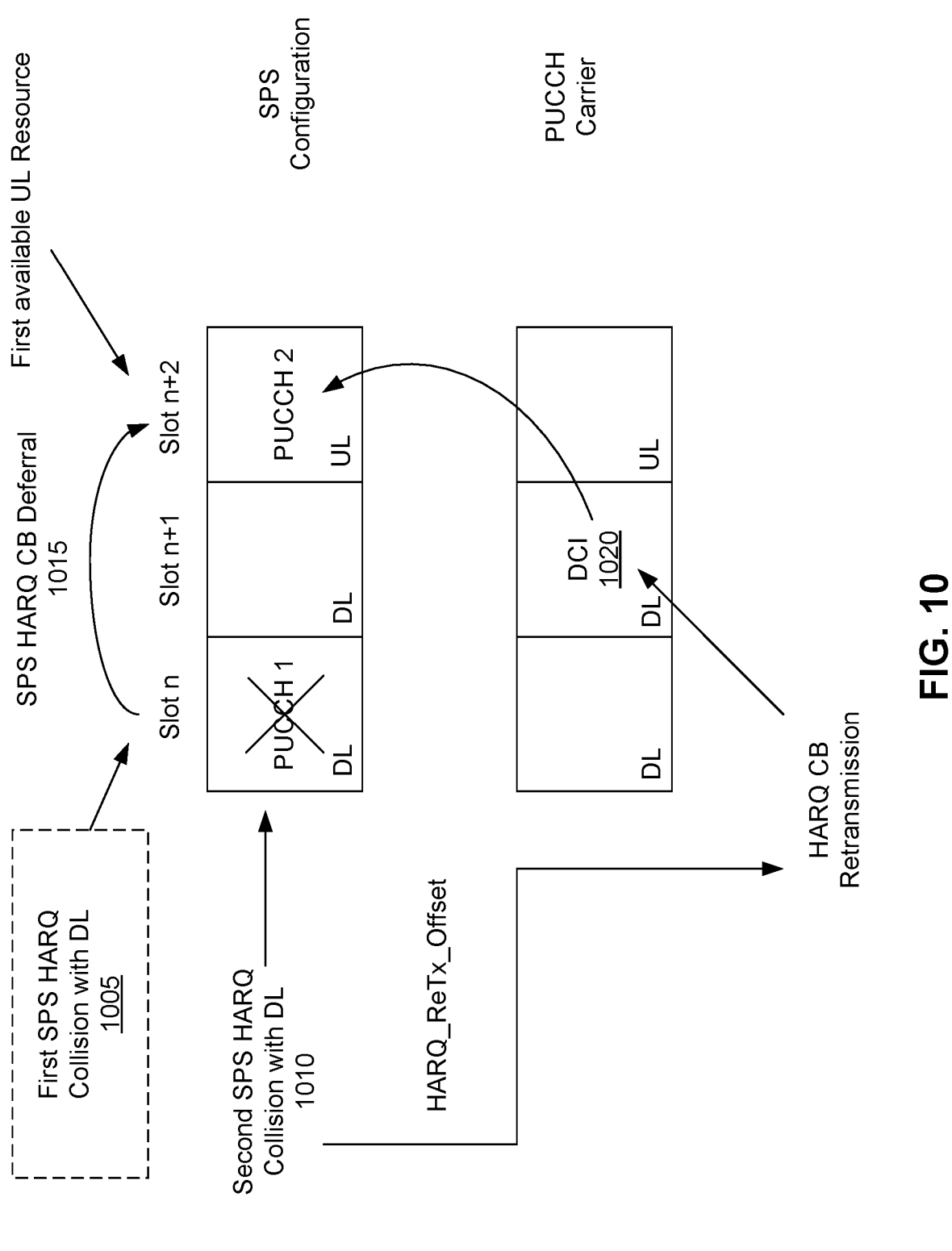
FIG. 10 is a diagram illustrating a third example associated with resolving a HARQ codebook interaction.

FIG. 10 is a diagram illustrating an example 1000 of a third example for resolving a HARQ codebook interaction, in accordance with the present disclosure.

In some aspects, the UE 120 may detect an overlap between a first deferred SPS HARQ codebook, a second deferred SPS HARQ codebook, and the retransmitted HARQ codebook. In this example, a first SPS HARQ codebook may be deferred based at least in part on the first SPS HARQ collision with the DL (as shown by reference number 1005). Additionally, a second SPS HARQ codebook may be deferred based at least in part on the second SPS HARQ collision with the DL (as shown by reference number 1010). The first SPS HARQ codebook and the second SPS HARQ codebook may be deferred to the slot n+2, as shown by the SPS HARQ CB deferral 1015. In some aspects, after the SPS HARQ codebook deferral (e.g., after slot n), but prior to transmitting the first deferred SPS HARQ codebook and the second SPS HARQ codebook (at slot n+2), the UE 120 may receive DCI 1020 that indicates to perform a retransmission of the HARQ codebook. Thus, the first deferred SPS HARQ codebook, the second deferred SPS HARQ codebook, and the retransmitted HARQ codebook may be scheduled in the slot n+2 (e.g., via PUCCH 2). In this example, the slot n+2 includes the first available uplink resource. For example, the PUCCH 2 is the first available PUCCH resource.

In some aspects, the UE 120 may transmit the second deferred SPS HARQ codebook via the PUCCH 2. For example, the second deferred SPS HARQ codebook bits may be transmitted via the HARQ codebook retransmission in slot n+2. In this case, the first SPS HARQ codebook may be appended to the retransmitted HARQ codebook.

In some aspects, the UE 120 may transmit the first deferred SPS HARQ codebook and the second deferred SPS HARQ codebook via the PUCCH 2. For example, the first deferred SPS HARQ codebook bits and the second deferred SPS HARQ codebook bits may be transmitted via the HARQ codebook retransmission in slot n+2. In some aspects, the first deferred SPS HARQ codebook bits may be transmitted prior to the second deferred SPS HARQ code-book bits. In some aspects, the second deferred SPS HARQ codebook bits may be transmitted prior to the first deferred SPS HARQ codebook bits.

In some aspects, the UE 120 may transmit the first deferred SPS HARQ codebook and the second deferred SPS HARQ codebook in accordance with a PUCCH resource indicator (PRI). The PRI may be indicated by the DCI that triggers the HARQ codebook retransmission. The PRI may indicate an order for transmitting the first deferred SPS HARQ codebook and the second deferred SPS HARQ codebook. In some aspects, the PRI may indicate for the first deferred SPS HARQ codebook bits to be transmitted prior to the second deferred SPS HARQ codebook bits. In some cases, the PRI may indicate for the second deferred SPS HARQ codebook bits to be transmitted prior to the first deferred SPS HARQ codebook bits.

As indicated above, FIG. 10 is provided as an example. Other examples may differ from what is provided with regard to FIG. 10.

FIG. 11 is a diagram illustrating an example 1100 of a fourth example for resolving a HARQ codebook interaction, in accordance with the present disclosure.

In some aspects, the UE 120 may detect an overlap between a first deferred SPS HARQ codebook, a second deferred SPS HARQ codebook, and the retransmitted HARQ codebook. In this example, a first SPS HARQ codebook may be deferred based at least in part on a first SPS HARQ collision with the DL (as shown by reference number 1105). Additionally, a second SPS HARQ codebook may be deferred based at least in part on a second SPS HARQ collision with the DL (as shown by reference number 1110). For example, the first SPS HARQ codebook and the second SPS HARQ codebook may be deferred to the slot n+2, as shown by the SPS HARQ CB deferral 1115. In some aspects, after the SPS HARQ codebook deferral (e.g., after slot n), but prior to transmitting the first deferred SPS HARQ codebook and the second SPS HARQ codebook (at slot n+2), the UE 120 may receive DCI 1120 that indicates to perform a retransmission of the HARQ codebook. Thus, the first deferred SPS HARQ codebook, the second deferred SPS HARQ codebook, and the retransmitted HARQ code-book may be scheduled in the slot n+2. In this example, the slot n+2 does not include the first available uplink resource. For example, the PUCCH 2 is not the first available PUCCH resource.

In some aspects, the UE 120 may transmit the second deferred SPS HARQ codebook via the PUCCH 2, and may drop the first deferred SPS HARQ codebook. For example, the second deferred SPS HARQ codebook bits may be transmitted via the HARQ codebook retransmission in the slot n+2, and the first deferred SPS HARQ codebook bits may be dropped (e.g., not transmitted).

In some aspects, the UE 120 may transmit the second deferred SPS HARQ codebook via the PUCCH that is scheduled by the DCI, and may further defer the first deferred SPS HARQ codebook. For example, the second deferred SPS HARQ codebook bits may be transmitted via the HARQ codebook retransmission in the slot n+2, and the first deferred SPS HARQ codebook bits may be further deferred (e.g., to a slot n+2+k).

As indicated above, FIG. 11 is provided as an example. Other examples may differ from what is provided with regard to FIG. 11.

FIG. 12 is a diagram illustrating an example process 1200 performed, for example, by a UE, in accordance with the present disclosure. Example process 1200 is an example where the UE (e.g., UE 120) performs operations associated with HARQ codebook interaction.

As shown in FIG. 12, in some aspects, process 1200 may include detecting an overlap between two or more deferred SPS HARQ codebooks and a retransmitted HARQ code-book (block 1210). For example, the UE (e.g., using communication manager 140 and/or detection component 1308, depicted in FIG. 13) may detect an overlap between two or more deferred SPS HARQ codebooks and a retransmitted HARQ codebook, as described above.

As further shown in FIG. 12, in some aspects, process 1200 may include canceling a transmission of the two or more deferred SPS HARQ codebooks or performing the transmission of the two or more deferred SPS HARQ codebooks in one or more slots (block 1220). For example, the UE (e.g., using communication manager 140 and/or canceling component 1310, depicted in FIG. 13) may cancel a transmission of the two or more deferred SPS HARQ codebooks or perform the transmission of the two or more deferred SPS HARQ codebooks in one or more slots, as described above.

Process 1200 may include additional aspects, such as any single aspect or any combination of aspects described below and/or in connection with one or more other processes described elsewhere herein.

In a first aspect, detecting the overlap between the two or more deferred SPS HARQ codebooks and the retransmitted HARQ codebook comprises detecting that the two or more deferred SPS HARQ codebooks and the retransmitted HARQ codebook are scheduled in a same PUCCH resource.

In a second aspect, alone or in combination with the first aspect, process 1200 includes receiving downlink control information that triggers the retransmitted HARQ codebook.

In a third aspect, alone or in combination with one or more of the first and second aspects, canceling the transmission of the two or more deferred SPS HARQ codebooks comprises not transmitting the two or more deferred SPS HARQ codebooks, wherein the two or more deferred SPS HARQ codebooks are scheduled in a slot comprising a first available PUCCH resource.

In a fourth aspect, alone or in combination with one or more of the first through third aspects, process 1200 includes performing a transmission of the retransmitted HARQ codebook in a slot comprising a next available PUCCH resource after the first available PUCCH resource.

In a fifth aspect, alone or in combination with one or more of the first through fourth aspects, performing the transmission of the two or more deferred SPS HARQ codebooks in the different slot comprises performing the transmission of the two or more deferred SPS HARQ codebooks in a slot comprising a first available PUCCH resource, and performing a transmission of the retransmitted HARQ codebook in a slot that is after the transmission of the two or more deferred SPS HARQ codebooks.

In a sixth aspect, alone or in combination with one or more of the first through fifth aspects, the slot that is after the transmission of the two or more deferred SPS HARQ codebooks is a slot comprising a next available PUCCH resource after the first available PUCCH resource.

In a seventh aspect, alone or in combination with one or more of the first through sixth aspects, detecting the overlap between the two or more deferred SPS HARQ codebooks and the retransmitted HARQ codebook comprises detecting an overlap between a first deferred SPS HARQ codebook, a second deferred SPS HARQ codebook, and the retransmitted HARQ codebook.

In an eighth aspect, alone or in combination with one or more of the first through seventh aspects, the overlap between the first deferred SPS HARQ codebook, the second deferred SPS HARQ codebook, and the retransmitted HARQ codebook is associated with a PUCCH resource that corresponds to a first available PUCCH resource.

In a ninth aspect, alone or in combination with one or more of the first through eighth aspects, process 1200 includes transmitting one or more bits of the second deferred SPS HARQ codebook via the retransmitted HARQ codebook, and appending one or more bits of the first deferred SPS HARQ codebook to the retransmitted HARQ codebook.

In a tenth aspect, alone or in combination with one or more of the first through ninth aspects, process 1200 includes transmitting one or more bits of the first deferred SPS HARQ codebook and one or more bits of the second deferred SPS HARQ codebook via the retransmitted HARQ codebook.

In an eleventh aspect, alone or in combination with one or more of the first through tenth aspects, the one or more bits of the first deferred SPS HARQ codebook are transmitted prior to the one or more bits of the second deferred SPS HARQ codebook.

In a twelfth aspect, alone or in combination with one or more of the first through eleventh aspects, the one or more bits of the second deferred SPS HARQ codebook are transmitted prior to the one or more bits of the first deferred SPS HARQ codebook.

In a thirteenth aspect, alone or in combination with one or more of the first through twelfth aspects, process 1200 includes transmitting one or more bits of the first deferred SPS HARQ codebook and one or more bits of the second deferred SPS HARQ codebook in accordance with a PUCCH resource indicator (PRI).

In a fourteenth aspect, alone or in combination with one or more of the first through thirteenth aspects, the PRI is received via downlink control information (DCI) that schedules the retransmitted HARQ codebook.

In a fifteenth aspect, alone or in combination with one or more of the first through fourteenth aspects, the overlap between the first deferred SPS HARQ codebook, the second deferred SPS HARQ codebook, and the retransmitted HARQ codebook is associated with a PUCCH resource that does not correspond to a first available PUCCH resource.

In a sixteenth aspect, alone or in combination with one or more of the first through fifteenth aspects, process 1200 includes transmitting one or more bits of the second deferred SPS HARQ codebook via the retransmitted HARQ codebook, and dropping the first deferred SPS HARQ codebook.

In a seventeenth aspect, alone or in combination with one or more of the first through sixteenth aspects, process 1200 includes transmitting one or more bits of the second deferred SPS HARQ codebook via the retransmitted HARQ codebook, and performing an additional deferring of the first deferred SPS HARQ codebook.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a detection component 1308, a canceling component 1310, an appending component 1312, a dropping component 1314, or a deferring component 1316, among other examples.

In some aspects, the apparatus 1300 may be configured to perform one or more operations described herein in connection with FIGS. 7-11. Additionally, or alternatively, the apparatus 1300 may be configured to perform one or more processes described herein, such as process 1200 of FIG. 12. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The detection component 1308 may detect an overlap between two or more deferred SPS HARQ codebooks and a retransmitted HARQ codebook. The canceling component 1310 may cancel a transmission of the two or more deferred SPS HARQ codebooks or perform the transmission of the two or more deferred SPS HARQ codebooks in one or more slots.

The reception component 1302 may receive downlink control information that triggers the retransmitted HARQ codebook. The transmission component 1304 may perform a transmission of the retransmitted HARQ codebook in a slot comprising a next available PUCCH resource after the first available PUCCH resource.

The detection component 1308 may detect an overlap between a first deferred SPS HARQ codebook, a second deferred SPS HARQ codebook, and the retransmitted HARQ codebook. The transmission component 1304 may transmit one or more bits of the second deferred SPS HARQ codebook via the retransmitted HARQ codebook. The appending component 1312 may append one or more bits of the first deferred SPS HARQ codebook to the retransmitted HARQ codebook. The transmission component 1304 may transmit one or more bits of the first deferred SPS HARQ codebook and one or more bits of the second deferred SPS HARQ codebook via the retransmitted HARQ codebook. The transmission component 1304 may transmit one or more bits of the first deferred SPS HARQ codebook and one or more bits of the second deferred SPS HARQ codebook in accordance with a PRI. The transmission component 1304 may transmit one or more bits of the second deferred SPS HARQ codebook via the retransmitted HARQ codebook. The dropping component 1314 may drop the first deferred SPS HARQ codebook. The transmission component 1304 may transmit one or more bits of the second deferred SPS HARQ codebook via the retransmitted HARQ codebook. The deferring component 1316 may perform an additional deferring of the first deferred SPS HARQ codebook.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: detecting an overlap between two or more deferred semi-persistent scheduling (SPS) hybrid automatic repeat request (HARQ) codebooks and a retransmitted HARQ codebook; and canceling a transmission of the two or more deferred SPS HARQ codebooks or performing the transmission of the two or more deferred SPS HARQ codebooks in a different slot than a slot that is to be used for the retransmitted HARQ codebook.

Aspect 2: The method of Aspect 1, wherein detecting the overlap between the two or more deferred SPS HARQ codebooks and the retransmitted HARQ codebook comprises: detecting that the two or more deferred SPS HARQ codebooks and the retransmitted HARQ codebook are scheduled in a same physical uplink control channel (PUCCH) resource.

Aspect 3: The method of any of Aspects 1-2, further comprising: receiving downlink control information that triggers the retransmitted HARQ codebook.

Aspect 4: The method of any of Aspects 1-3, wherein canceling the transmission of the two or more deferred SPS HARQ codebooks comprises: not transmitting the two or more deferred SPS HARQ codebooks, wherein the two or more deferred SPS HARQ codebooks are scheduled in a slot comprising a first available physical uplink control channel (PUCCH) resource.

Aspect 5: The method of Aspect 4, further comprising: performing a transmission of the retransmitted HARQ codebook in a slot comprising a next available PUCCH resource after the first available PUCCH resource.

Aspect 6: The method of any of Aspects 1-5, wherein performing the transmission of the two or more deferred SPS HARQ codebooks in the different slot comprises: performing the transmission of the two or more deferred SPS HARQ codebooks in a slot comprising a first available physical uplink control channel (PUCCH) resource; and performing a transmission of the retransmitted HARQ codebook in a slot that is after the transmission of the two or more deferred SPS HARQ codebooks.

Aspect 7: The method of Aspect 6, wherein the slot that is after the transmission of the two or more deferred SPS HARQ codebooks is a slot comprising a next available PUCCH resource after the first available PUCCH resource.

Aspect 8: The method of any of Aspects 1-7, wherein detecting the overlap between the two or more deferred SPS HARQ codebooks and the retransmitted HARQ codebook comprises: detecting an overlap between a first deferred SPS HARQ codebook, a second deferred SPS HARQ codebook, and the retransmitted HARQ codebook.

Aspect 9: The method of Aspect 8, wherein the overlap between the first deferred SPS HARQ codebook, the second deferred SPS HARQ codebook, and the retransmitted HARQ codebook is associated with a physical uplink control channel (PUCCH) resource that corresponds to a first available PUCCH resource.

Aspect 10: The method of Aspect 9, further comprising: transmitting one or more bits of the second deferred SPS HARQ codebook via the retransmitted HARQ codebook; and appending one or more bits of the first deferred SPS HARQ codebook to the retransmitted HARQ codebook.

Aspect 11: The method of Aspect 9, further comprising: transmitting one or more bits of the first deferred SPS HARQ codebook and one or more bits of the second deferred SPS HARQ codebook via the retransmitted HARQ codebook.

Aspect 12: The method of Aspect 11, wherein the one or more bits of the first deferred SPS HARQ codebook are transmitted prior to the one or more bits of the second deferred SPS HARQ codebook.

Aspect 13: The method of Aspect 11, wherein the one or more bits of the second deferred SPS HARQ codebook are transmitted prior to the one or more bits of the first deferred SPS HARQ codebook.

Aspect 14: The method of Aspect 9, further comprising: transmitting one or more bits of the first deferred SPS HARQ codebook and one or more bits of the second deferred SPS HARQ codebook in accordance with a PUCCH resource indicator (PRI).

Aspect 15: The method of Aspect 14, wherein the PRI is received via downlink control information (DCI) that schedules the retransmitted HARQ codebook.

Aspect 16: The method of Aspect 8, wherein the overlap between the first deferred SPS HARQ codebook, the second deferred SPS HARQ codebook, and the retransmitted HARQ codebook is associated with a physical uplink control channel (PUCCH) resource that does not correspond to a first available PUCCH resource.

Aspect 17: The method of Aspect 16, further comprising: transmitting one or more bits of the second deferred SPS HARQ codebook via the retransmitted HARQ codebook; and dropping the first deferred SPS HARQ codebook.

Aspect 18: The method of Aspect 16, further comprising: transmitting one or more bits of the second deferred SPS HARQ codebook via the retransmitted HARQ codebook; and performing an additional deferring of the first deferred SPS HARQ codebook.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element+(e.g., a+a, a+a+a, a+a+b, a+a+c, a+b+b, a+c+c, b+b, b+b+b,+b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

a memory; and one or more processors, coupled to the memory, configured to:

detect an overlap between two or more deferred semi-persistent scheduling (SPS) hybrid automatic repeat request (HARQ) codebooks and a retransmitted HARQ codebook;

cancel a transmission of the two or more deferred SPS HARQ codebooks in a slot comprising a first available physical uplink control channel (PUCCH) resource;

determine another slot comprising a next available PUCCH resource after the first available PUCCH resource; and perform the transmission based at least in part on determining the other slot.

2. The apparatus of claim 1, wherein the one or more processors, to detect the overlap between the two or more deferred SPS HARQ codebooks and the retransmitted HARQ codebook, are configured to:

detect that the two or more deferred SPS HARQ codebooks and the retransmitted HARQ codebook are scheduled in a same PUCCH resource.

3. The apparatus of claim 1, wherein the one or more processors are further configured to receive downlink control information that triggers the retransmitted HARQ codebook.

4. The apparatus of claim 1, wherein the one or more processors, to perform the transmission, are further configured to:

perform transmission of the retransmitted HARQ codebook in the other slot comprising the next available PUCCH resource after the first available PUCCH resource.

5. The apparatus of claim 1, wherein the one or more processors, to detect the overlap between the two or more deferred SPS HARQ codebooks and the retransmitted HARQ codebook, are configured to:

detect an overlap between a first deferred SPS HARQ codebook, a second deferred SPS HARQ codebook, and the retransmitted HARQ codebook.

6. The apparatus of claim 5, wherein the overlap between the first deferred SPS HARQ codebook, the second deferred SPS HARQ codebook, and the retransmitted HARQ codebook is associated with a PUCCH resource that corresponds to the first available PUCCH resource.

7. The apparatus of claim 6, wherein the one or more processors are further configured to:

transmit one or more bits of the second deferred SPS HARQ codebook via the retransmitted HARQ codebook; and append one or more bits of the first deferred SPS HARQ codebook to the retransmitted HARQ codebook.

8. The apparatus of claim 6, wherein the one or more processors are further configured to:

transmit one or more bits of the first deferred SPS HARQ codebook and one or more bits of the second deferred SPS HARQ codebook via the retransmitted HARQ codebook.

9. The apparatus of claim 8, wherein the one or more bits of the first deferred SPS HARQ codebook are transmitted prior to the one or more bits of the second deferred SPS HARQ codebook.

10. The apparatus of claim 8, wherein the one or more bits of the second deferred SPS HARQ codebook are transmitted prior to the one or more bits of the first deferred SPS HARQ codebook.

11. The apparatus of claim 6, wherein the one or more processors are further configured to:

transmit one or more bits of the first deferred SPS HARQ codebook and one or more bits of the second deferred SPS HARQ codebook in accordance with a PUCCH resource indicator (PRI).

12. The apparatus of claim 11, wherein the PRI is received via downlink control information (DCI) that schedules the retransmitted HARQ codebook.

13. The apparatus of claim 5, wherein the overlap between the first deferred SPS HARQ codebook, the second deferred SPS HARQ codebook, and the retransmitted HARQ codebook is associated with a PUCCH resource that does not correspond to the first available PUCCH resource.

14. The apparatus of claim 13, wherein the one or more processors are further configured to:

transmit one or more bits of the second deferred SPS HARQ codebook via the retransmitted HARQ codebook; and drop the first deferred SPS HARQ codebook.

15. The apparatus of claim 13, wherein the one or more processors are further configured to:

transmit one or more bits of the second deferred SPS HARQ codebook via the retransmitted HARQ codebook; and perform an additional deferring of the first deferred SPS HARQ codebook.

16. A method of wireless communication performed by a user equipment (UE), comprising:

detecting an overlap between two or more deferred semi-persistent scheduling (SPS) hybrid automatic repeat request (HARQ) codebooks and a retransmitted HARQ codebook;

canceling a transmission of the two or more deferred SPS HARQ codebooks in a slot comprising a first available physical uplink control channel (PUCCH) resource;

determining another slot comprising a next available PUCCH resource after the first available PUCCH resource; and performing the transmission based at least in part on determining the other slot.

17. The method of claim 16, wherein detecting the overlap between the two or more deferred SPS HARQ codebooks and the retransmitted HARQ codebook comprises:

detecting an overlap between a first deferred SPS HARQ codebook, a second deferred SPS HARQ codebook, and the retransmitted HARQ codebook.

18. The method of claim 17, wherein the overlap between the first deferred SPS HARQ codebook, the second deferred SPS HARQ codebook, and the retransmitted HARQ codebook is associated with a physical PUCCH resource that corresponds to the first available PUCCH resource.

19. The method of claim 18, further comprising:
transmitting one or more bits of the second deferred SPS HARQ codebook via the retransmitted HARQ codebook; and
appending one or more bits of the first deferred SPS HARQ codebook to the retransmitted HARQ codebook.

20. The method of claim 18, further comprising:
transmitting one or more bits of the first deferred SPS HARQ codebook and one or more bits of the second deferred SPS HARQ codebook via the retransmitted HARQ codebook.

21. The method of claim 20,
wherein the one or more bits of the first deferred SPS HARQ codebook are transmitted prior to the one or more bits of the second deferred SPS HARQ codebook.

22. The method of claim 20,
wherein the one or more bits of the second deferred SPS HARQ codebook are transmitted prior to the one or more bits of the first deferred SPS HARQ codebook.

23. The method of claim 18, further comprising:
transmitting one or more bits of the first deferred SPS HARQ codebook and one or more bits of the second deferred SPS HARQ codebook in accordance with a PUCCH resource indicator (PRI).

24. The method of claim 23,
wherein the PRI is received via downlink control information (DCI) that schedules the retransmitted HARQ codebook.

25. The method of claim 17,
wherein the overlap between the first deferred SPS HARQ codebook, the second deferred SPS HARQ codebook, and the retransmitted HARQ codebook is associated with a PUCCH resource that does not correspond to first available PUCCH resource.

26. The method of claim 25, further comprising:
transmitting one or more bits of the second deferred SPS HARQ codebook via the retransmitted HARQ codebook; and
dropping the first deferred SPS HARQ codebook.

27. The method of claim 25, further comprising:
transmitting one or more bits of the second deferred SPS HARQ codebook via the retransmitted HARQ codebook; and performing an additional deferring of the first deferred SPS HARQ codebook.

28. A non-transitory computer-readable medium storing a set of instructions for wireless communication, the set of instructions comprising:
one or more instructions that, when executed by one or more processors of a user equipment (UE), cause the UE to:
detect an overlap between two or more deferred semi-persistent scheduling (SPS) hybrid automatic repeat request (HARQ) codebooks and a retransmitted HARQ codebook;
cancel a transmission of the two or more deferred SPS HARQ codebooks in a slot comprising a first available physical uplink control channel (PUCCH) resource;
determine another slot comprising a next available PUCCH resource after the first available PUCCH resource; and
perform the transmission based at least in part on determining the other slot.

29. An apparatus for wireless communication, comprising:
means for detecting an overlap between two or more deferred semi-persistent scheduling (SPS) hybrid automatic repeat request (HARQ) codebooks and a retransmitted HARQ codebook;
means for canceling a transmission of the two or more deferred SPS HARQ codebooks in a slot comprising a first available physical uplink control channel (PUCCH) resource;
means for determining another slot comprising a next available PUCCH resource after the first available PUCCH resource; and
means for performing the transmission based at least in part on determining the other slot.

30. The method of claim 16,
wherein performing the transmission comprises:
performing transmission of the retransmitted HARQ codebook in the other slot comprising the next available PUCCH resource after the first available PUCCH resource.

* * * * *